United States Patent
Peppoloni et al.

(10) Patent No.: US 12,430,923 B2
(45) Date of Patent: *Sep. 30, 2025

(54) SYSTEMS AND METHODS FOR DERIVING AN AGENT TRAJECTORY BASED ON MULTIPLE IMAGE SOURCES

(71) Applicant: Lyft, Inc., San Francisco, CA (US)

(72) Inventors: Lorenzo Peppoloni, London (GB); Michal Witkowski, London (GB)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,041

(22) Filed: Apr. 15, 2024

(65) Prior Publication Data

US 2024/0265707 A1     Aug. 8, 2024

Related U.S. Application Data

(63) Continuation of application No. 16/922,962, filed on Jul. 7, 2020, now Pat. No. 11,961,241, and a (Continued)

(51) Int. Cl.
G06V 20/56 (2022.01)
B60W 40/09 (2012.01)
G06T 7/00 (2017.01)

(52) U.S. Cl.
CPC ............. *G06V 20/56* (2022.01); *B60W 40/09* (2013.01); *G06T 7/97* (2017.01); *B60W 2420/403* (2013.01); *B60W 2554/4041* (2020.02)

(58) Field of Classification Search
CPC ........ G06V 20/56; G06V 10/82; G06V 20/58; B60W 40/09; B60W 2420/42; B60W 2554/4041; B60W 2556/35; B60W 60/00272; G06T 7/97; G06T 7/246; G06T 7/277; G06T 2207/10016; G06T 2207/10021; G06T 2207/20081; G06T 2207/20084; G06T 2207/30241; G06T 2207/30252
See application file for complete search history.

(56) References Cited

U.S. PATENT DOCUMENTS 8,289,390 B2   10/2012   Aggarwal et al.
11,010,907 B1   5/2021   Bagwell
(Continued)

FOREIGN PATENT DOCUMENTS

WO   2019116958 A1   6/2019
WO   2020171605 A1   8/2020

*Primary Examiner* — Dhaval V Patel
(74) *Attorney, Agent, or Firm* — Lee Sullivan Shea & Smith LLP

(57) ABSTRACT

Examples disclosed herein may involve a computing system that is operable to (i) derive, from a first set of one or more images captured by a monocular camera associated with a vehicle, a first set of position information for a given agent; (ii) derive, from a second set of one or more image pairs captured by a stereo camera associated with the vehicle, a second set of position information for the given agent; (iii) input the first and second sets of position information for the given agent into a motion model that encodes knowledge regarding physical constraints on the given agent's real-world behavior; and (iv) determine a trajectory for the given agent based on an output of the motion model.

20 Claims, 26 Drawing Sheets

Related U.S. Application Data continuation of application No. 16/922,955, filed on Jul. 7, 2020, now Pat. No. 11,961,304.

(56) References Cited

U.S. PATENT DOCUMENTS

| | | |
|---|---|---|
| 2006/0028552 A1 | 2/2006 | Aggarwal et al. |
| 2008/0101652 A1 | 5/2008 | Zhao et al. |
| 2009/0243889 A1 | 10/2009 | Suhr et al. |
| 2010/0165102 A1 | 7/2010 | Klebanov et al. |
| 2010/0250064 A1* | 9/2010 | Ota .................... B60W 40/076 348/148 |
| 2016/0101779 A1* | 4/2016 | Katoh .................... G08G 1/166 340/435 |
| 2018/0137649 A1 | 5/2018 | Schulter et al. |
| 2018/0307922 A1* | 10/2018 | Yoon ......................... G06T 7/55 |
| 2020/0349366 A1 | 11/2020 | Takemura et al. |
| 2021/0272304 A1 | 9/2021 | Yang et al. |
| 2021/0364321 A1 | 11/2021 | Lee |
| 2021/0398318 A1 | 12/2021 | Deng et al. |
| 2022/0126844 A1* | 4/2022 | Di Stefano ............ G06V 20/56 |

* cited by examiner

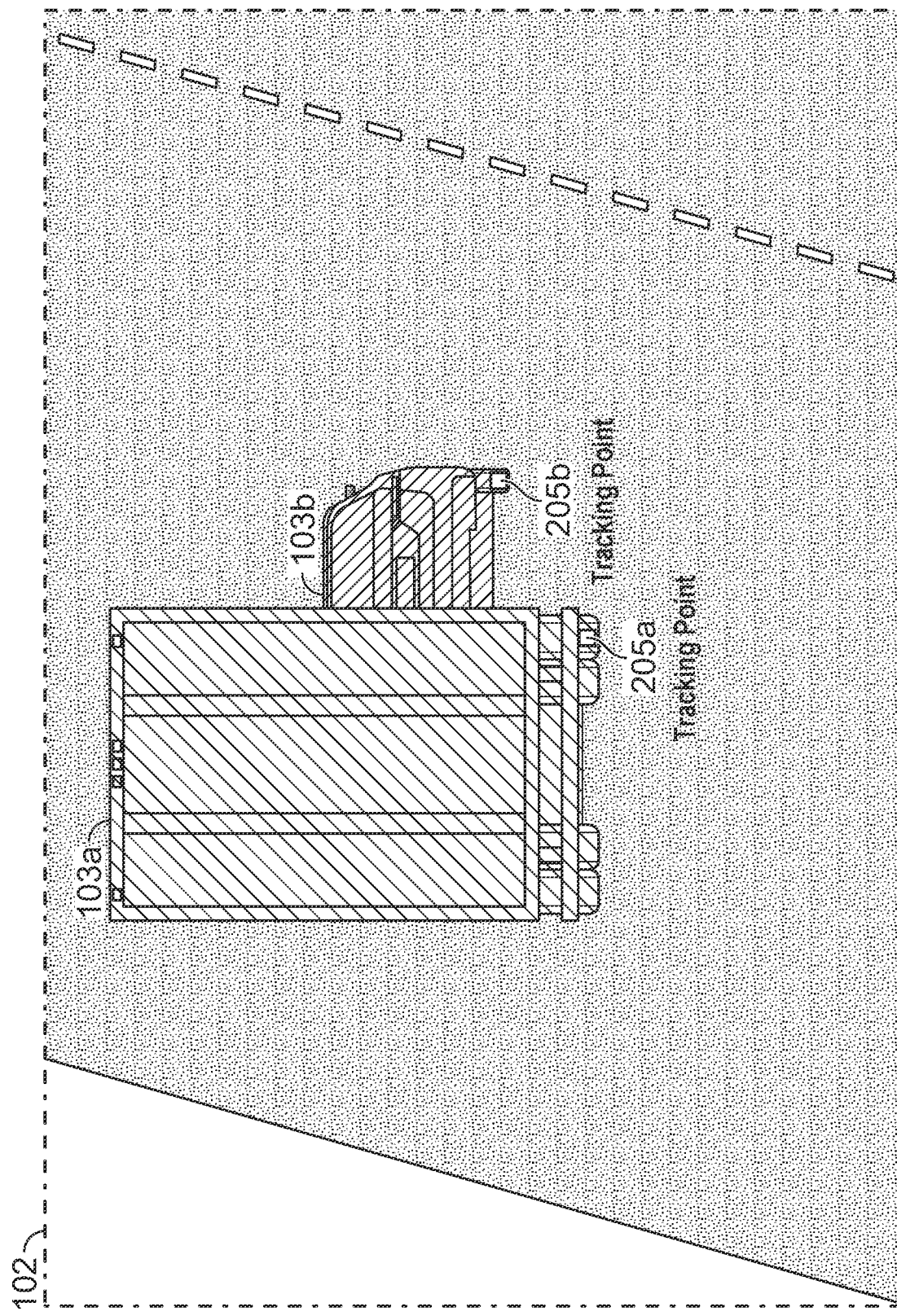

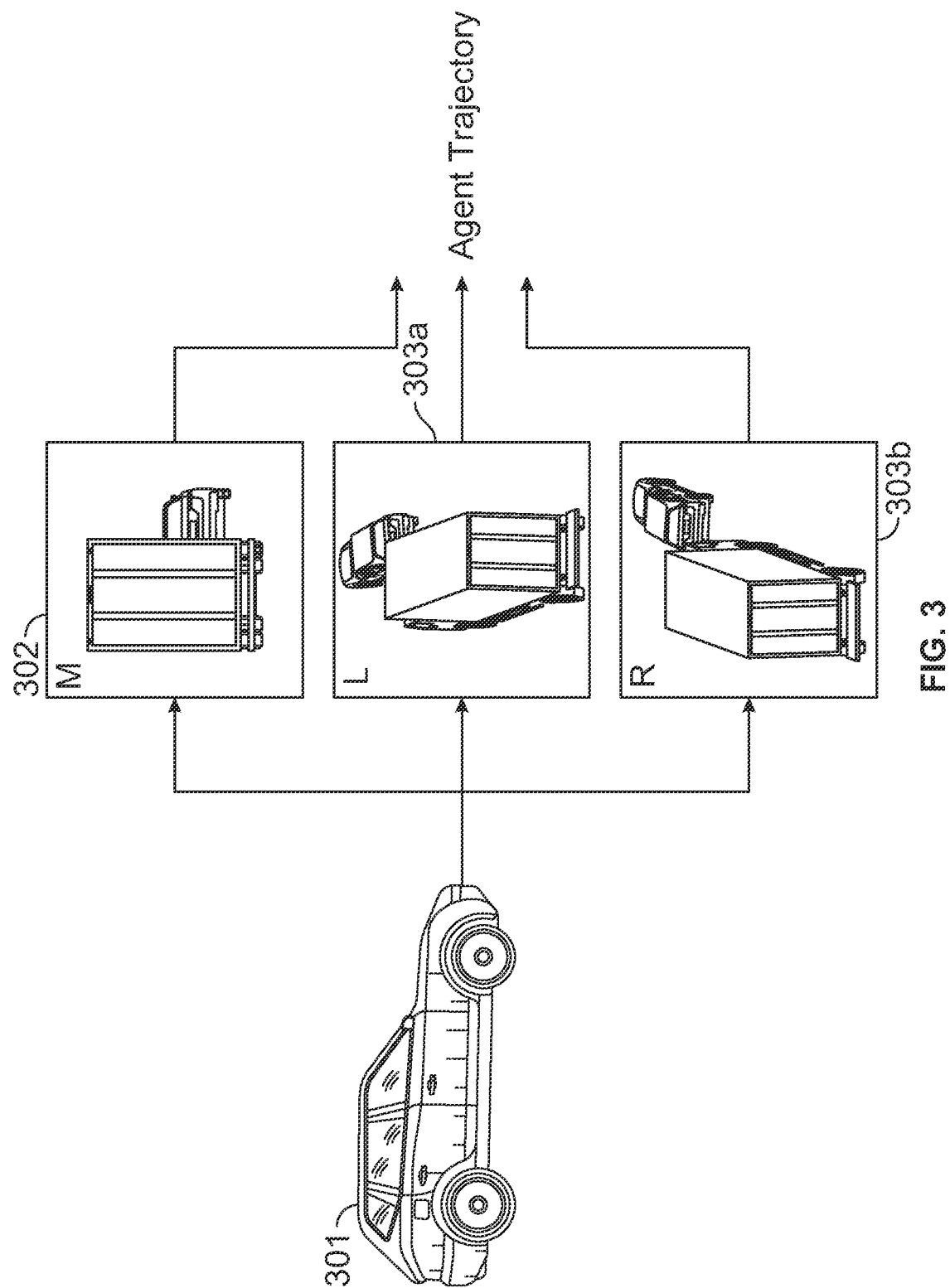

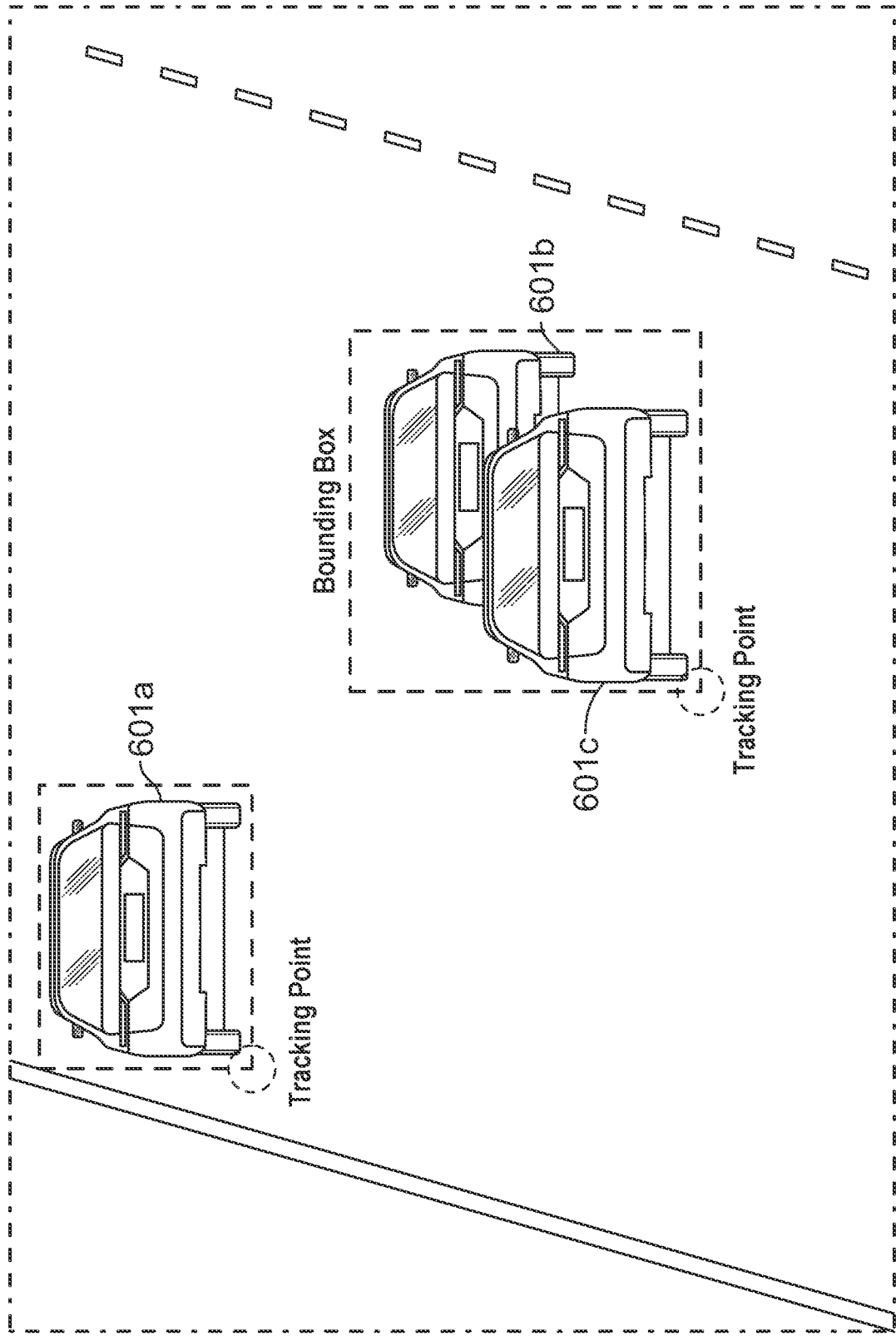

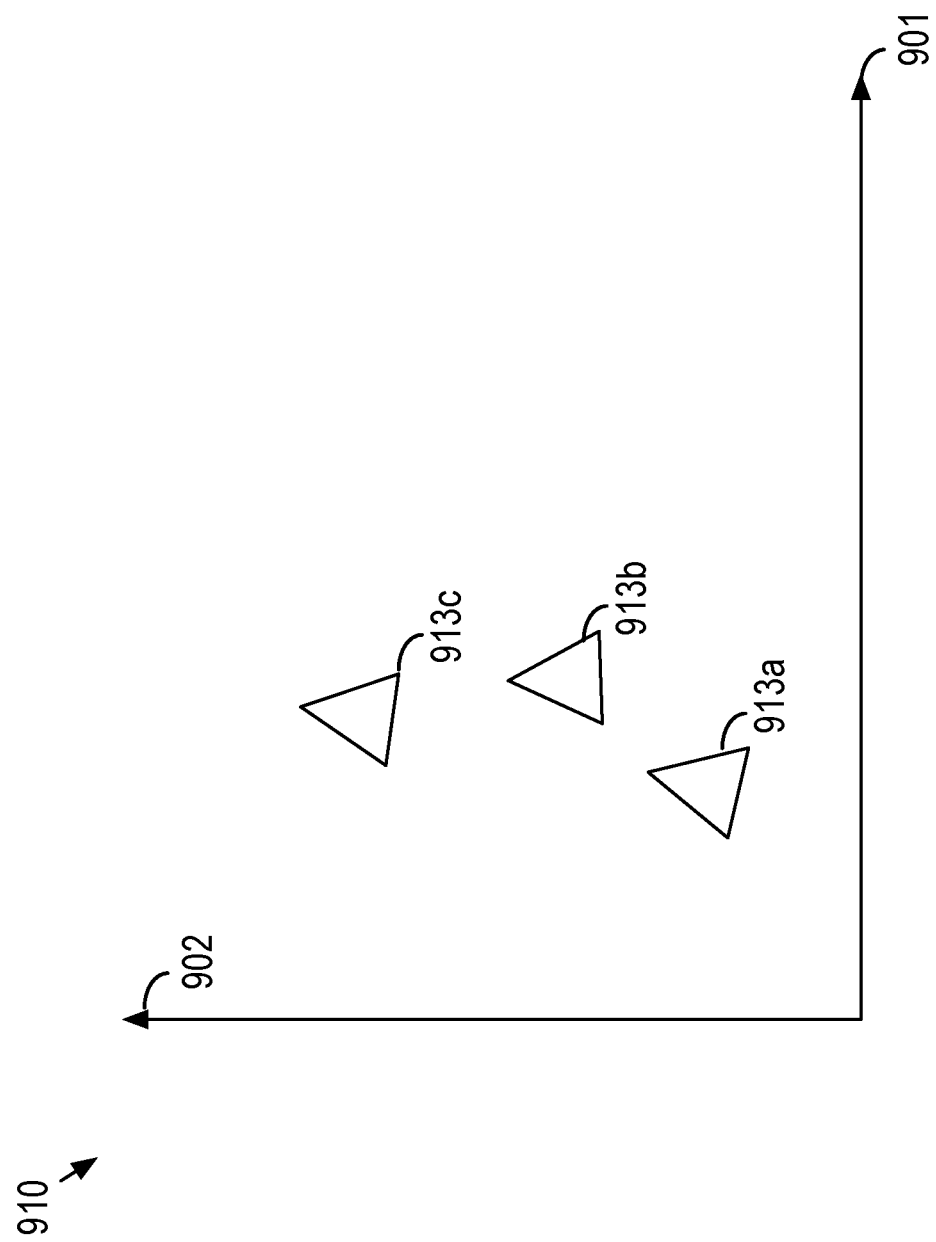

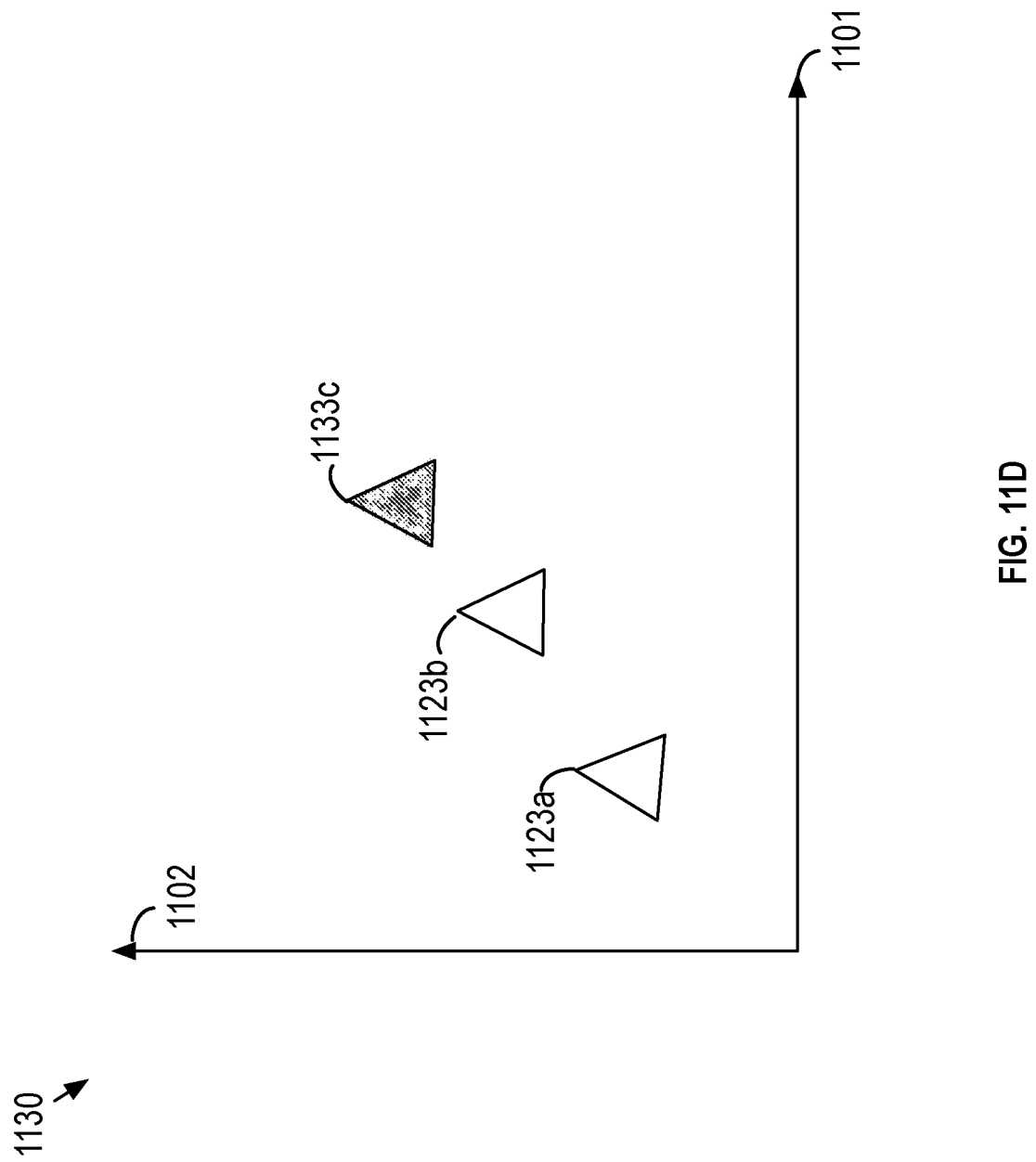

SYSTEMS AND METHODS FOR DERIVING AN AGENT TRAJECTORY BASED ON MULTIPLE IMAGE SOURCES

CROSS-REFERENCE TO RELATED APPLICATIONS

The current application is a continuation of U.S. patent application Ser. No. 16/922,955, filed on Jul. 7, 2020, and of U.S. patent application Ser. No. 16/922,962, filed on Jul. 7, 2020. Both of these applications are incorporated by reference in their entirety for all purposes.

BACKGROUND

Vehicles are increasingly being equipped with sensors that capture sensor data while such vehicles are operating in the real world, and this captured sensor data may then be used for many different purposes, examples of which may include building an understanding of how vehicles and/or other types of agents (e.g., pedestrians, bicyclists, etc.) tend to behave within the real world and/or generating other pre-processed information about the world. The sensor data that is captured by these sensor-equipped vehicles may take any of various forms, examples of which include Global Positioning System (GPS) data, Inertial Measurement Unit (IMU) data, camera image data, Light Detection and Ranging (LiDAR) data, Radio Detection And Ranging (RADAR) data, and/or Sound Navigation and Ranging (SONAR) data, among various other possibilities.

SUMMARY

In one aspect, the disclosed technology may take the form of a first method that involves (i) receiving a sequence of images captured by a camera associated with a vehicle, where each image was captured at a respective capture time during a period of operation of the vehicle, (ii) for each respective image in at least a subset of images in the sequence in which a given agent is detected: (a) generating a respective pixel mask that identifies a boundary of the given agent within the respective image and distinguishes the given agent from any other agent appearing within the respective image, (b) identifying, as a respective tracking point for the given agent within the respective image, at least one given pixel within the respective pixel mask that is representative of an estimated intersection point between the given agent and a ground plane within the vehicle's surrounding environment, and (c) based on the respective tracking point for the given agent within the respective image and information regarding the ground plane within the vehicle's surrounding environment, determining a position of the given agent at the respective capture time of the respective image, and (iii) determining a trajectory for the given agent based on the determined positions of the given agent.

In example embodiments of the first method, the given agent may be partially occluded in one or more images in the subset of images. In example embodiments, for each respective image in the subset of images in which the given agent was partially occluded, (a) a respective pixel mask for the given agent may still be generated that delineates a visible portion of the given agent within the respective image, (b) a given pixel within the respective pixel mask may still be identified as a respective tracking point for the given agent within the respective image, and (c) a position of the given agent at the respective capture time of the respective image may still be determined based on the respective tracking point despite the given agent being partially occluded within the respective image, where the determined position may be subsequently used to determine the trajectory for the given agent.

Further, in example embodiments of the first method, the given agent may be fully occluded in one or more images in the sequence of images such that there is one or more time gaps in the determined positions for the given agent, and determining the trajectory for the given agent based on the determined positions the given agent may comprise inferring a position of the given agent for each of the one or more time gaps based on other determined positions of the given agent.

Further yet, in example embodiments of the first method, determining the trajectory for the given agent based on the determined positions of the given agent may comprise (a) identifying one or more determined positions of the given agent that are inconsistent with physical constraints on the given agent's real-world movement, and (b) updating the identified one or more determined positions of the given agent to account for the physical constraints on the given agent's real-world movement.

Still further, in example embodiments of the first method, identifying, as a respective tracking point for the given agent within a given respective image in the subset of images, at least one given pixel within the respective pixel mask that is representative of an estimated intersection point between the given agent and a ground plane within the vehicle's surrounding environment may comprise identifying, as the respective tracking point for the given agent within the respective image, a pixel within the respective pixel mask that is closest to a bottom of the respective image, where the identified pixel is then used as a basis for determining a position of the given agent at the respective capture time of the respective image.

Even further, in example embodiments of the first method, identifying, as a respective tracking point for the given agent within a given respective image in the subset of images, at least one given pixel within the respective pixel mask that is representative of an estimated intersection point between the given agent and a ground plane within the vehicle's surrounding environment may comprise (a) identifying a ground feature within the respective image, (b) identifying one or more pixels within the respective pixel mask that are adjacent to the ground feature, and (c) identifying, from the one or more pixels that are identified as being adjacent to the ground feature, at least one pixel that is closest to a bottom of the respective image, where the identified at least one pixel is then used as a basis for determining a position of the given agent at the respective capture time of the respective image.

In other example embodiments of the first method, determining a position of the given agent at a respective capture time of a given respective image in the subset of images based on a respective tracking point for the given agent within the respective image and information regarding the ground plane within the vehicle's surrounding environment may comprise (a) determining an association between the respective tracking point for the given agent within the respective image and a given ground point within the vehicle's surrounding environment, (b) determining a three-dimensional (3D) position of the given ground point using a ground map that provides information regarding the 3D geospatial geometry of the ground plane within the vehicle's surrounding environment, and (c) using the determined 3D position of the given ground point to determine a 3D position of the given agent at the respective capture time of the respective image.

In these example embodiments of the first method, determining the association between the respective tracking point for the given agent within the respective image and the given ground point within the vehicle's surrounding environment may comprise (a) casting a ray from the camera through the respective tracking point for the given agent within the respective image to the ground plane for the vehicle's surrounding environment, and (b) based on an angle of the cast ray and the ground map, determining that the cast ray intersects with the ground plane at the given ground point.

Further, in these example embodiments of the first method, using the determined 3D position of the given ground point to determine the 3D position of the given agent at the respective capture time of the respective image may comprise translating the determined 3D position of the given ground point to an estimated center point of the given agent using information regarding the physical dimensions of the given agent.

Moreover, in example embodiments of the first method, determining the trajectory of the given agent based on the determined positions of the given agent may comprise (a) inputting the determined positions of the given agent into a motion model that encodes knowledge regarding physical constraints on the given agent's real-world behavior, where the motion model corrects for missing or errant position information, and (b) determining the trajectory of the given agent based on the motion model's output.

In another aspect, the disclosed technology may take the form of a second method that involves (i) receiving a first sequence of images captured by a monocular camera associated with a vehicle during a given period of operation and a second sequence of image pairs captured by a stereo camera associated with the vehicle during the given period of operation, (ii) deriving, from the first sequence of images captured by the monocular camera, a first track for a given agent that comprises a first sequence of position information for the given agent, (iii) deriving, from the second sequence of image pairs captured by the stereo camera, a second track for the given agent that comprises a second sequence of position information for the given agent, and (iv) determining a trajectory for the given agent based on the first and second tracks for the given agent.

In example embodiments of the second method, (i) the position information in first track may be more accurate than the position information in the second track at a first set of one or more times within the given period of operation when the given agent was more than a given distance away from the vehicle and (ii) the position information in the second track may be more accurate than the position information in the first track at a second set of times within the given period of operation when the given agent was less than the given distance away from the vehicle.

Further, in example embodiments of the second method, (i) the first track may include one or more gaps in the first sequence of position information due to the given agent being at least partially occluded in one or more images included in the first sequence of images and (ii) the second track may include one or more gaps in the second sequence of position information due to the given agent being at least partially occluded in one or more image pairs included in the second sequence of image pairs.

In these example embodiments of the second method, determining the trajectory for the given agent based on the first and second tracks for the given agent may comprise (a) inferring position information for each gap included in the first track based on other position information included in the first track, and (b) inferring position information for each gap included in the second track based on other position information included in the second track.

Still further, in example embodiments of the second method, determining the trajectory for the given agent based on the first and second tracks for the given agent may comprise (a) identifying position information included in one or both of the first track or the second track that is inconsistent with physical constraints on the given agent's real-world movement, and (b) updating the identified position information included in one or both of the first track or the second track to account for the physical constraints on the given agent's real-world movement.

Even further, in example embodiments of the second method, determining the trajectory for the given agent based on the first and second tracks for the given agent may comprise (a) for each respective time of a plurality of times within the given period of operation: (1) based on the first track for the given agent, determining first position information for the given agent at the respective time, (2) based on the second track for the given agent, determining second position information for the given agent at the respective time, and (3) aggregating the first position information for the given agent at the respective time and the second position information for the given agent at the respective time and thereby producing aggregated position information for the given agent at the respective time, and (b) compiling the aggregate position information for each respective time of the plurality of times into the trajectory for the given agent. In such example embodiments, the first position information for the given agent at the respective time and the second position information for the given agent at the respective time may each be associated with a respective measure of confidence, and aggregating the first position information for the given agent at the respective time and the second position information for the given agent at the respective time may comprise weighting the first position information for the given agent at the respective time and the second position information for the given agent at the respective time based on respective measures of confidence.

In other example embodiments of the second method, determining the trajectory of the given agent based on the first and second tracks for the given agent may comprise (a) inputting the first and second tracks for the given agent into a motion model that encodes knowledge regarding physical constraints on the given agent's real-world behavior, where the motion model fuses the first and second tracks while also correcting for missing or errant position information within the first and second tracks, and (b) determining the trajectory of the given agent based on the motion model's output.

In still other example embodiments of the second method, the stereo camera associated with the vehicle may comprise a pair of cameras in a stereo configuration, and the pair of cameras may include the monocular camera.

In further example embodiments of the second method, deriving, from the first sequence of images captured by the monocular camera, the first track for the given agent may comprise (a) detecting the given agent in each of a subset of images in the first sequence, where each image in the subset of images was captured at a respective capture time, (b) for each image in the subset of images, (1) identifying a tracking point for the given agent within the image, (2) determining an association between the identified tracking point and a given ground point within the vehicle's surrounding environment, (3) determining a three-dimensional (3D) position of the given ground point (e.g., based on one or both of a ground map that provides information regarding the 3D geospatial geometry of the ground surface within the vehicle's surrounding environment or 3D position information for the given ground point that is derived from the second sequence of images captured by the stereo camera), and (4) using the determined 3D position of the given ground point to determine a 3D position of the given agent at the respective capture time of the image, and (c) deriving the first track based on the determined 3D positions of the given agent at the respective capture times of the images in the subset of images.

Moreover, in example embodiments of the second method, deriving, from the second sequence of image pairs captured by the stereo camera, the second track for the given agent may comprise (a) detecting the given agent in each of a subset of image pairs in the second sequence, wherein each image pair in the subset of image pairs was captured at a respective capture time, (b) for each image pair in the subset of image pair, (1) identifying a pair of corresponding tracking points within the image pair that represent a common reference point of the given agent, and (2) applying triangulation to the identified pair of corresponding tracking points within the image pair in order to determine a three-dimensional (3D) position of the common reference point of the given agent, and (3) using the determined 3D position of the common reference point of the given agent to determine a 3D position of the given agent at the respective capture time of the image pair, and (c) deriving the second track based on the determined 3D positions of the given agent at the respective capture times of the image pairs in the subset of image pairs.

In yet another aspect, the disclosed technology may take the form of a computing system comprising at least one processor, a non-transitory computer-readable medium, and program instructions stored on the non-transitory computer-readable medium that are executable by the at least one processor such that the computing system is configured to carry out one or more functions of one or more of the aforementioned methods.

In a further aspect, the disclosed technology may take the form of a non-transitory computer-readable medium comprising program instructions stored thereon that are executable to cause a computing system to carry out one or more functions of one or more of the aforementioned methods.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 2B is a simplified illustration of the mono image captured by the monocular camera in FIG. 2A along with conceptual illustrations of certain aspects of the first approach for deriving agent trajectories described herein.

FIG. 3 is a simplified conceptual diagram that provides a high-level summary of a second approach for deriving agent trajectories described herein.

FIG. 7B is a conceptual illustration of an example output of a bounding-box object-detection model based on a mono image from a second point in time.

FIG. 9B is a simplified, two-dimensional representation of a trajectory that is output by a motion model based on the agent track represented in FIG. 9A.

FIG. 11D is a simplified, two-dimensional representation of a trajectory with a predicted agent pose that is output by the motion model for the agent whose trajectory is represented in FIG. 11C.

DETAILED DESCRIPTION

Figure 1A:
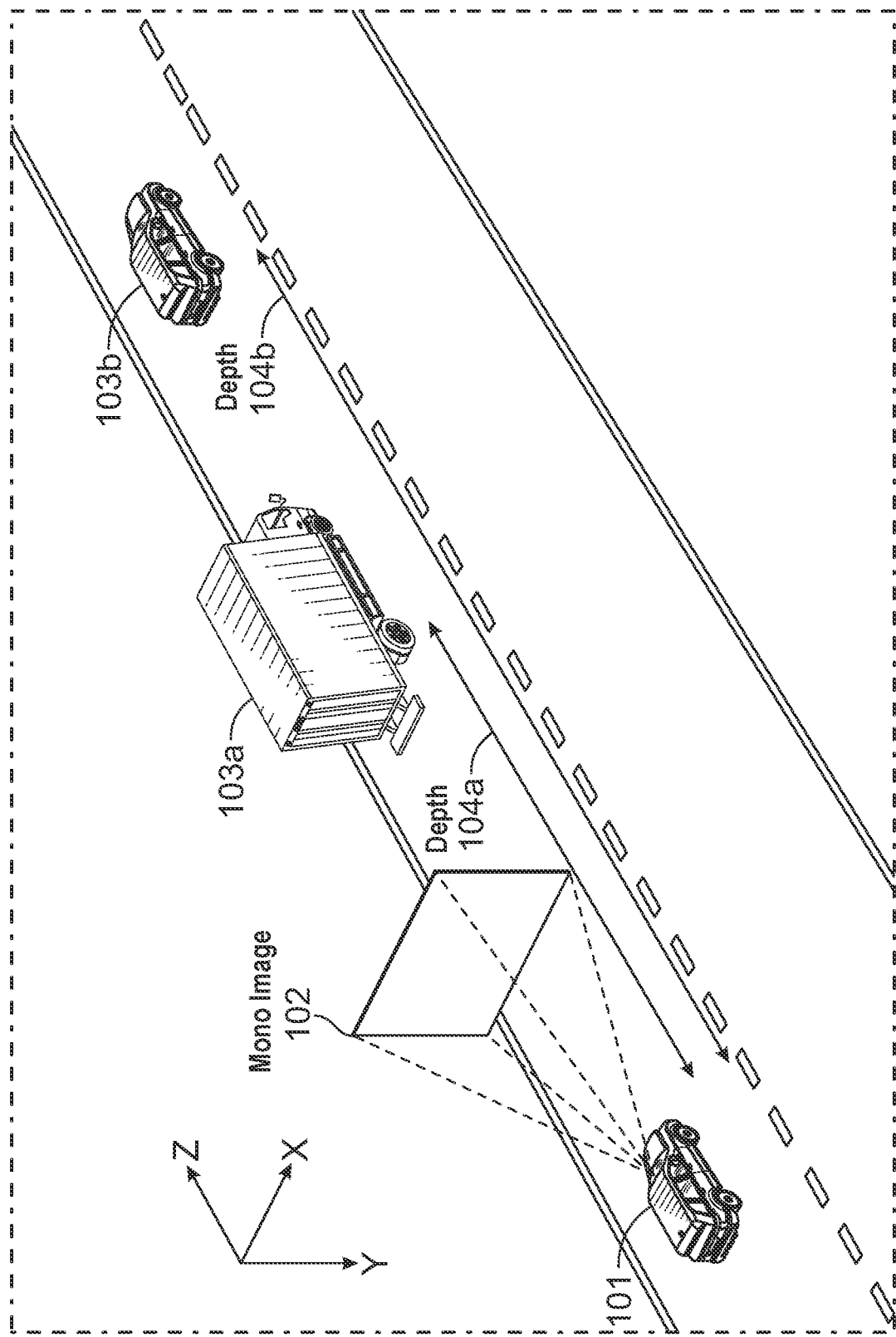
FIG. 1A is a simplified, three-dimensional perspective view of a vehicle having an associated monocular camera that has captured a mono image of the vehicle's surrounding environment at a given point in time.

Information regarding the prior behavior of vehicles or other types of agents within the real world can be used in various areas of technology to help improve operation. One specific example of this information is prior trajectories for vehicles or other types of agents in the real world, which can be used to help facilitate and improve various aspects of technology. (As used herein, a prior "trajectory" for an agent generally refers to the agent's motion and location within the real world over the course of some period of time, which may be represented in terms of a sequence of timestamped position and orientation ("pose") values for the agent, among other possibilities).

For instance, as one possibility, prior trajectories for vehicles or other types of agents in the real world can be encoded into a set of pre-processed information about the world (which may sometimes be referred to as a map or map data) that is made available to on-board computing systems of vehicles (e.g., vehicles equipped with autonomy systems and/or advanced driver assistance systems), and such prior trajectories can then be used by the vehicles' on-board computing systems to perform various operations.

One such operation may involve planning the future behavior of a vehicle, which generally involves deriving a behavior plan for the vehicle that defines the desired driving behavior of the vehicle for some future period of time (e.g., the next 5 seconds)—including the planned trajectory of the vehicle for that future period of time. For example, to the extent that a vehicle's on-board computing system has access to prior vehicle trajectories for the road on which the vehicle is currently traveling, the vehicle's on-board computing system may use those prior vehicle trajectories during planning in order to derive a planned trajectory for the vehicle that is informed by how other vehicles have historically traversed that same road.

Another such operation may involve predicting the future behavior of agents surrounding a vehicle. For example, to the extent that a vehicle's on-board computing system has access to prior agent trajectories for the road on which the vehicle is currently traveling, the vehicle's on-board computing system may use those prior agent trajectories to help predict the future behavior of agents surrounding the vehicle, and this predicted behavior of the surrounding agents may then be used to inform the on-board computing system's planning of the vehicle's behavior.

On-board computing systems of vehicles may use prior agent trajectories to help facilitate other operations as well.

As another possibility, prior trajectories of agents can be used to train machine learning models that are employed by on-board computing systems of vehicles during operation, such as machine learning models for predicting the future trajectories of surrounding agents that are detected by a vehicle's on-board computing system.

As yet another possibility, prior trajectories of vehicles and/or other types of agents in the real world can be encoded into a set of pre-processed information about the world that is made available to a transportation-matching platform (e.g., a platform that is configured to match individuals interested in obtaining transportation with vehicles capable of providing such transportation), and such prior trajectories can then be used by the transportation-matching platform to perform various different operations, including but not limited to matching individuals with available vehicles within the given area, generating the most optimal routes for vehicles to follow when picking up and/or transporting individuals within the given area, providing accurate estimates of pickup and drop-off times within the given area, and/or effectively pre-positioning vehicles within the given area in anticipation of responding to transportation requests, among other possibilities.

It should be understood that prior trajectories of agents can also be used to improve other technology areas as well.

In view of the foregoing, there is a need for an approach that allows prior trajectories of agents to be collected in a way that is both accurate and scalable. More specifically, in order to be used for the purposes discussed above, the prior agent trajectories that are collected need to have a certain level of accuracy (e.g., at least lane-level accuracy). Likewise, in order to achieve the improvements discussed above, prior trajectories of agents generally need to be collected on a very large scale. For example, if the goal is to encode prior trajectories of agents into map data that is used by on-board computing systems or transportation matching platforms to help perform certain operations in an improved way, then prior trajectories of agents need to be collected across an expansive array of different geographic areas. As another example, if the goal is to use prior trajectories of agents to train machine learning models utilized by a vehicle's on-board computing system to predict future trajectories of surrounding agents, then prior trajectories of agents need to be collected for a wide range of different circumstances that could potentially be faced by a vehicle.

One existing approach for collecting prior trajectories of agents makes use of vehicles that are installed with expensive, high-fidelity sensor systems, such as the types of Light Detection and Ranging (LiDAR)-based sensor systems that are found on autonomous vehicles, which are typically comprised of a LiDAR unit combined with a 360°-camera array and telematics sensors (among other possible types of high-fidelity sensor systems). As a vehicle equipped with such a LiDAR-based sensor system is being driven within a given area of the real world (typically by humans, but perhaps also with some level of autonomous operation), the vehicle's LiDAR-based sensor system captures high-fidelity sensor data that is indicative of the movement and location of the vehicle and perhaps other agents surrounding the vehicle within the given area, and processing may then be applied to this high-fidelity sensor data in order to derive trajectory information for the vehicle itself and perhaps also other agents in proximity to the vehicle.

Beneficially, the trajectories that are collected in this manner typically have a high level of accuracy. However, the total number of vehicles equipped with these types of LiDAR-based sensor systems that currently exist in the world is relatively small—which is due to the fact that equipping vehicles with LiDAR-based sensor systems is expensive and currently provides limited practical value outside of high-definition data collection and autonomous driving—and vehicles with these types of LiDAR-based sensor systems are typically only found in a limited subset of geographic areas (e.g., cities where autonomous-driving technology is being tested). As such, it is currently neither practical nor realistic to collect prior trajectories of agents on a large scale using vehicles with these types of LiDAR-based sensor systems.

One possible way to overcome these scalability problems would be to collect prior trajectories of agents using sensor systems that are less costly and/or are more widely available than the types of expensive, LiDAR-based sensor systems typically found on autonomous vehicles. For instance, it may be possible to collect prior trajectories of agents using a sensor system comprised of a monocular camera and telematics sensors, which may be integrated into a vehicle and/or may be embodied within a separate device such as a smartphone, a tablet, a dashcam, or the like that can be attached to or otherwise placed within a vehicle (e.g., by being mounted on a dashboard, a windshield, a roof, and/or a hood of a vehicle). Beneficially, if prior trajectories of agents could be collected with sufficient accuracy using a sensor system comprised of a monocular camera and telematics sensors—which is relatively inexpensive and already included in a wide range of consumer electronic devices that are commonly found in vehicles—this would allow prior trajectories of agents to be collected on a much larger scale than an approach that relies on vehicles that have been installed with the types of expensive, LiDAR-based sensor systems typically found on autonomous vehicles. However, deriving agent trajectories from image data captured by the monocular cameras (which may be referred to herein as "mono images") included in such sensor systems presents various technical challenges.

First, in contrast to the sensor data captured by LiDAR-based sensors systems, mono images captured by monocular camera do not natively include any information regarding the depth of agents that appear within such mono images (i.e., how far away such vehicles and/or other agents actually were from the monocular camera when the mono images were captured), and it is technically difficult to accurately estimate the depth of such agents from mono images alone. Because of this limitation, it has generally been difficult to derive an accurate estimate of the position of agents within the real world from mono images alone, which is a critical aspect of deriving accurate trajectories for agents.

Figure 1B:
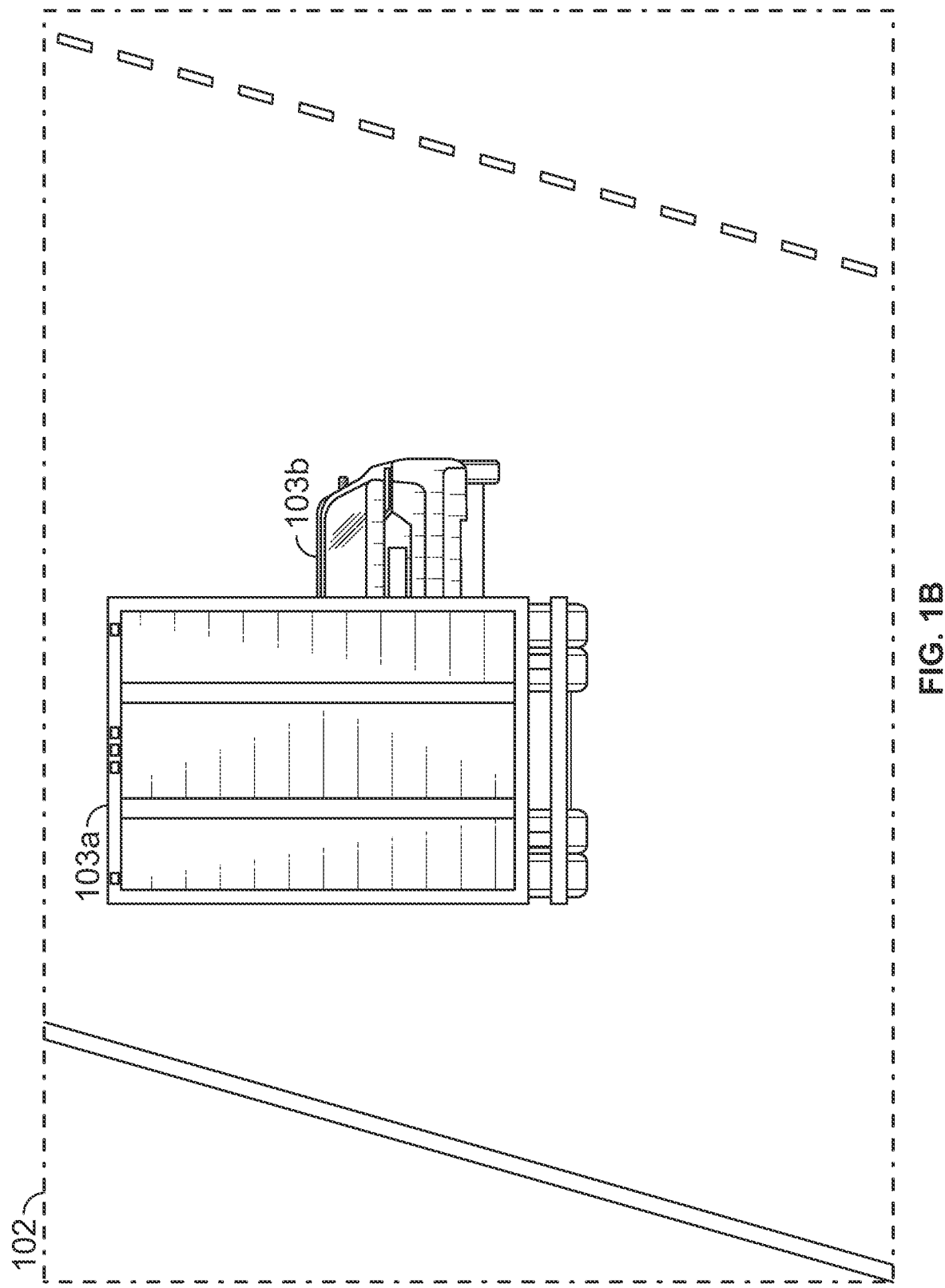
FIG. 1B is a simplified illustration of the mono image captured by the monocular camera in FIG. 1A.

FIGS. 1A and 1B help to illustrate the lack of depth information in a mono image. In particular, FIG. 1A provides a three-dimensional (3D) perspective view of a vehicle 101 having an associated monocular camera that has captured a mono image 102 (illustrated in further detail in FIG. 1B) of the vehicle's surrounding environment at a given point in time when vehicle 101 is following two other vehicles 103a and 103b. In FIG. 1A, the distance between the monocular camera at vehicle 101 and vehicle 103a is represented by depth line 104a and the distance between the monocular camera at vehicle 101 and vehicle 103b is represented by depth line 104b. While these depths are apparent from the 3D perspective view in FIG. 1A, as shown in FIG. 1B, mono image 102 lacks depth information corresponding to vehicles 103a and 103b.

Thus, the only way to determine the position of agents within the real world from mono images is by using machine learning models and/or other complex calculations and/or calibration techniques that attempt to estimate the depth of the agents appearing within the mono images, which is then incorporated into the position information that is determined for such agents. However, as noted above, existing techniques for determining the position of agents within the real world from mono images may not provide position information for such agents that is accurate enough to form the basis for agent trajectories that are to be used for the types of applications discussed above, particularly for agents that are further away from the monocular camera-which is due to limitations in the monocular camera's field of view.

Second, the agents being captured by the monocular camera are likely to become at least partially occluded by other objects in the monocular camera's field of view (e.g., other agents) at various times during the capture window, it is technically difficult to handle such occlusion when attempting to track agents and derive agent trajectories using mono images. In this respect, FIGS. 1A and 1B provide an example illustration of agent occlusion. As shown in these figures, vehicle 103a partially obstructs the monocular camera's view of vehicle 103b such that only a portion of vehicle 103b is represented in mono image 102. A complete occlusion would occur when vehicle 103a wholly obstructs the monocular camera's view of vehicle 103b such that no portion of vehicle 103b is captured in the mono image.

As a result of occlusion, existing computer approaches for tracking a particular agent through a sequence of mono images are often inaccurate and unreliable, which in turn leads to inaccuracies in agent trajectories derived from such mono images. For example, when a particular agent is occluded in certain images, existing techniques may either fail to detect the particular agent in such images or may incorrectly identify some other tracking point within the image that is not actually associated with the particular agent, which may introduce gaps and/or noise in the trajectory derived for the particular agent that makes it difficult to use such trajectory for the applications discussed above.

Additional technical challenges related to deriving agent trajectories from image data captured by monocular cameras are also possible.

The present disclosure provides multiple approaches that help address the aforementioned problems. In a first approach, a vehicle may be associated with a sensor system comprising a single monocular camera is used to capture a sequence of mono images representing the vehicle's surroundings at different points in time across a period of operation, and then for each of certain agents of interest identified in the sequence of images, the disclosed technique involves (i) identifying a tracking point for an agent in each image where the agent appears that comprises a lowest-observed point of the agent within the image, which may provide an estimate of where some portion of the agent (e.g., a back tire of a vehicle) intersects a ground plane, (ii) using the tracking point for the agent in each image where the agent appears to derive a time-sequence of position information for the agent in a manner that accounts for the depth of the agent relative to the monocular camera, and then (iii) deriving a trajectory for the agent based on the time-sequence of position information for the agent (e.g., by inputting the time-sequence of position information for the agent into a motion model and designating the output of the motion model as the agent's trajectory).

Figure 2A:
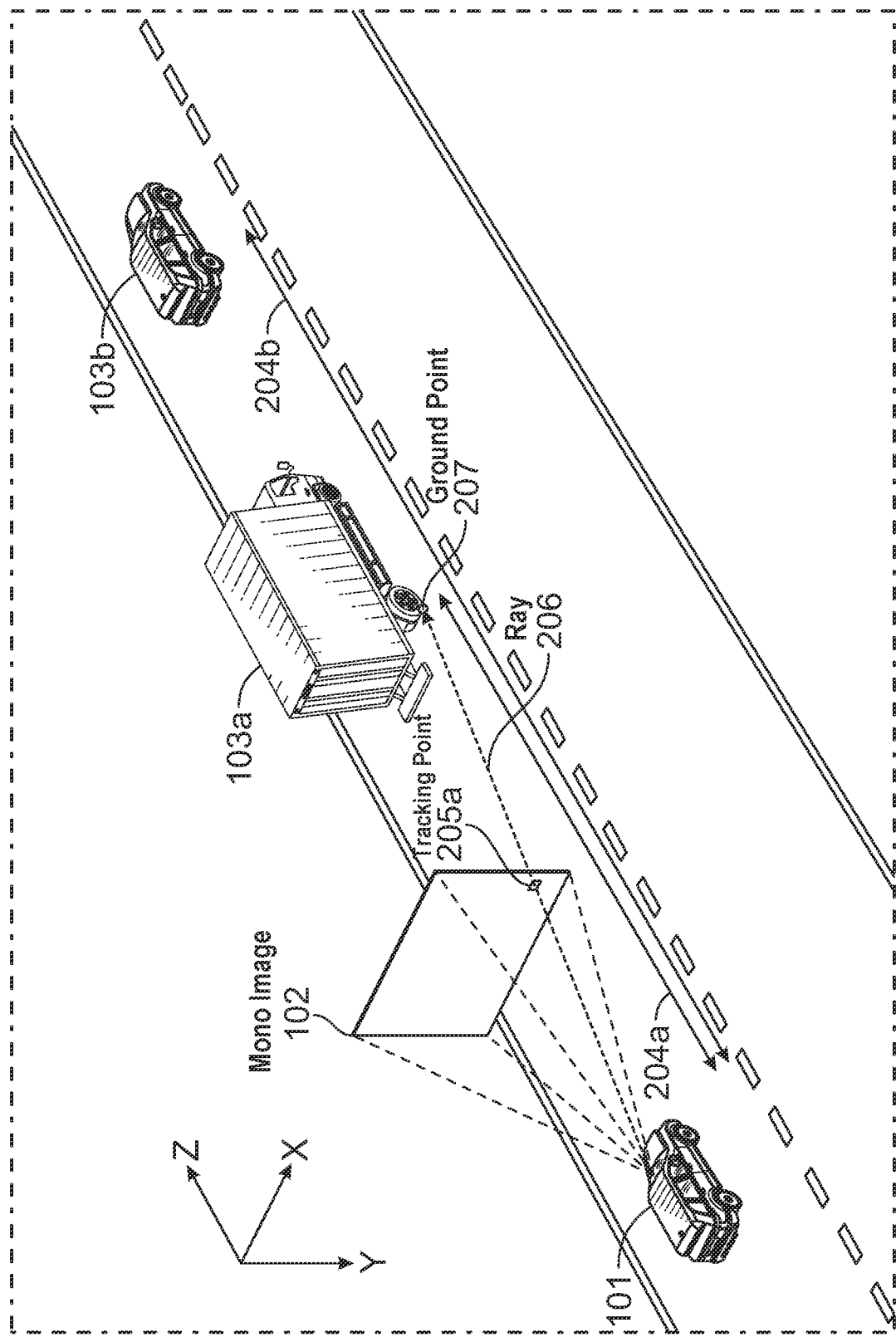
FIG. 2A is the simplified, three-dimensional perspective view of the vehicle from FIG. 1A along with conceptual illustrations of certain aspects of a first approach for deriving agent trajectories described herein.

FIGS. 2A and 2B provide a conceptual illustration of aspects of this first approach. In particular, FIG. 2A shows the same 3D perspective view as in FIG. 1A of vehicle 101 having an associated monocular camera that has captured mono image 102. Likewise, FIG. 2B provides a representation of mono image 102 similar to the representation in FIG. 1B.

However, unlike FIG. 1B, FIG. 2B includes (i) a respective pixel mask for vehicles 103a and 103b that may have been generated utilizing instance segmentation, which may identify the respective vehicle's boundary within the mono image and distinguish the respective vehicle from any other agent appearing within the mono image, and (ii) a mask corresponding to the ground plane that may have been identified utilizing semantic segmentation. In this example, a respective tracking point 205a and 205b was identified for vehicles 103a and 103b that corresponds to a respective lowest-observed pixel within the respective pixel masks for vehicles 103a and 103b (e.g., a pixel that is closest to the bottom of mono image 102). Based on these tracking points 205a and 205b, respective position information was derived for vehicles 103a and 103b in a manner that accounts for the depth of vehicles 103a and 103b relative to the monocular camera. For instance, using vehicle 103a as an example, a ray 206 may be cast from the monocular camera through tracking point 205a to intersect the ground plane, as shown in FIG. 2A. Based on ray 206 that has been cast through tracking point 205a and information about the ground plane (e.g., information about the 3D geospatial geometry of the ground plane that has been encoded into a ground map or the like), a 3D position of a ground point 207 corresponding to tracking point 205a for vehicle 103a can then be determined. In this respect, this 3D position of tracking point 205a provides an indication of the position of vehicle 103a in the real world that accounts for the depth of vehicle 103a relative to the monocular camera, which is represented by depth line 204a. (It should be understood that, in practice, the 3D position of tracking point 205a may be represented according to a world coordinate frame and thus may not include a direct measure of the vehicle's depth relative to the monocular camera, but that the vehicle's depth relative to the monocular camera is nevertheless accounted for in the determined 3D position, and that such depth could also be directly determined if desired by translating the determined 3D position of tracking point 205a from the world coordinate frame to the camera coordinate frame of the monocular camera). A similar process may be performed to derive position information for vehicle 103b that accounts for the depth of vehicle 103a relative to the monocular camera, which is represented by depth line 204b.

In example implementations, after this process is performed on a sequence of two or more mono images captured by the monocular camera in vehicle 101, then the respective position information for each of vehicles 103a and 103b may be used to derive a respective trajectory for each of vehicles 103a and 103b. This function may involve various operations for each of vehicles 103a and 103b, examples of which may include: (i) associating the determined position information for the vehicle across the different images where the vehicle appears (e.g., using an object tracking technique), (ii) based on the associated tracking points for the vehicle, deriving a respective time-sequence of position information for the vehicle, (iii) inferring position information for any time gaps in the respective time-sequence of position information for the vehicle (e.g., gaps resulting from the vehicle being at least partially occluded in certain mono images), (iv) updating any position information included in the respective time-sequence of position information for the vehicle that is inconsistent with physical constraints on the vehicle's real-world movement, and (v) compiling the resulting position information into the respective trajectory for the vehicle. In this respect, in at least some embodiments, the operations of inferring and/or updating position information may be accomplished by inputting the respective time-sequence of position information that is derived for the vehicle (and perhaps other state information such as orientation, velocity, and/or acceleration) into a motion model that applies pre-encoded knowledge about expected vehicle behavior in the real world (e.g., physical constraints on how a vehicle is capable of moving in the real world) in order to correct for missing or errant estimates of the vehicle's position within the time-sequence of position information, and then using the respective output of the motion model to define the vehicle's trajectory.

While the first approach is described herein in the context of images captured by a monocular camera, it should be understood that the disclosed approach could also be used to derive agent trajectories from images captured by some other type of camera.

This first approach is advantageous in that the requisite hardware (e.g., a single monocular camera) is already widely available and there are relatively low costs in terms of attaching this requisite hardware to (or otherwise placing the hardware within) a vehicle, which makes this approach widely deployable in many vehicles. Moreover, by applying a motion model to the lowest-observed point for an agent within each mono image in which the agent appears, this first approach provides way to derive a trajectory for an agent from mono images that is based on a more accurate estimate of the agent's depth relative to the monocular camera and is also less susceptible to missing or errant position estimates caused by occlusion, which helps improve upon existing techniques for deriving agent trajectories from mono images.

While less widely available than a sensor system comprising single monocular camera and telematics sensors, another relatively inexpensive sensor system that could be available for use in collecting agent trajectories may comprise a pair of two cameras that have been arranged into a stereo configuration (which may be referred to herein as a "stereo camera") along with telematics sensors, which may be integrated into a vehicle and/or may be embodied within one or more separate devices that can be attached to or otherwise placed within a vehicle (e.g., by being mounted on a dashboard, a windshield, a roof, and/or a hood of a vehicle). Such a stereo camera may be configured to capture a pair of images from two different fields of view (e.g., a field of view from the left side of the vehicle and from the right side of the vehicle, where this pair of images may collectively be referred to as a "stereo image."

In this respect, disclosed herein is a second approach for deriving agent trajectories from sensor data captured by a vehicle that is associated with both a monocular camera and also a stereo camera, which may comprise either a pair of additional cameras separate from the monocular camera or a pair of cameras that includes the single monocular camera as well as one additional monocular camera (e.g., the monocular camera may be part of the stereo configuration). Advantageously, this second technique may further enhance the accuracy of the agent trajectories collected by vehicles while at the same time still providing a more scalable approach than one that relies on vehicles installed with expensive LiDAR-based sensor systems.

According to the second approach disclosed herein, a monocular camera associated with a vehicle is used to capture a sequence of mono images representing the vehicle's surroundings across a period of operation and a stereo camera associated with the vehicle is used to capture a sequence of stereo images representing the vehicle's surroundings across a period of operation. These captured sequences of mono images and stereo images may then be used to derive respective sets of position information for certain agents identified in such images in a manner that accounts for the depth of such agents relative to the cameras. For instance, a first time-sequence of position information for a given agent may be derived from the sequence of mono images in a similar manner as in the first approach, and a second time-sequence of position information for the given agent may be derived from the sequence of stereo images utilizing image processing techniques such as triangulation or the like.

In turn, a trajectory for the given agent may be determined based on the first and second time-sequences of position information for the given agent. This function may involve various operations, examples of which may include (i) inferring position information for any time gaps in the first and/or second time-sequences of position information for the given agent (e.g., gaps resulting from the given agent being at least partially occluded in certain images), (ii) updating any position information included in the first and/or second time-sequences of position information for the given agent that is inconsistent with physical constraints on the given agent's real-world movement, (iii) aggregating each time-specific position included in the first time-sequence of position information with a corresponding time-specific position included in the second time-sequence of position information (e.g., by calculating an average of the corresponding first and second positions for each respective time that may optionally be weighted based on respective measures of confidence associated with the first and second positions), and (iv) compiling the resulting position information into the respective trajectory for the vehicle. In this respect, in at least some embodiments, these operations may be accomplished by inputting the first and second time-sequences of position information for the given agent (and perhaps other state information such as orientation, velocity, and/or acceleration) into a motion model that serves to "fuse" together the position information for the given agent that is derived from the two different image sources while also correcting for missing or errant estimates of the agent's position within such time-sequences of position information, and then using the resulting output of the motion model to define the given agent's trajectory.

FIG. 3 is a simplified conceptual illustration that provides a high-level summary of this second approach. In this example, vehicle 301 has a single monocular camera as well as a pair of additional monocular cameras in a stereo configuration that are co-located with vehicle 301. The single monocular camera captures a mono image 302 and the stereo camera captures a stereo image comprising left image 303a and right image 303b. As discussed in further detail below, information derived from these images is then utilized to facilitate deriving a respective trajectory for each of certain agents identified in the images.

Notably, this second approach is advantageous in that it takes advantage of the relative strengths of deriving agent trajectories from mono images and from stereo images. For instance, position information for an agent that is derived from stereo images typically incorporates a more accurate estimate of the agent's depth relative to the camera than estimated position information for an agent that is derived from mono images alone. However, there may be some specific circumstances where the position information for an agent that is derived from mono images may have an accuracy that is as good or better than the position information for an agent that is derived from stereo images. For instance, the accuracy of an agent's depth that is estimated from stereo images tends to degrade exponentially as the agent gets farther away from the camera, and at some threshold distance, the depth of the agent that is estimated using mono images may become more accurate than the depth of the agent that is estimated using stereo images. As a result, it is possible that the technique disclosed herein for deriving position information for an agent from mono images may incorporate an estimate of the agent's depth that is more accurate (or at least as accurate as) the estimate of the agent's depth that is incorporated into position information for the agent that is derived from stereo images when the agent is farther away from the camera. (In fact, if an agent is far enough away from the camera, it may not even be possible to derive position information for the agent that incorporates an estimate of the agent's depth from a stereo image). Further, at least in some circumstances, the position information for an agent that is derived from mono images may incorporate a more accurate estimate of the agent's lateral displacement to the camera than position information for an agent that is derived from stereo images alone. Thus, by fusing the position information derived from these two different image sources together, the second approach can make use two different "reference points" to derive an agent's trajectory, which may produce agent trajectories that have a higher level of accuracy than trajectories derived from mono images alone or trajectories derived from stereo images alone.

In practice, the first and second approaches disclosed herein may be utilized for a variety of purposes. For instance, the first and/or second approaches may be used to collect prior trajectories of agents, which may then be used for any of the various purposes described above, including but not limited to being utilized by on-board computing systems of vehicles or transportation-matching platforms to help perform various operations and/or being utilized to train machine learning models. Additionally, the first and/or second approaches could also be incorporated into technology employed by an on-board computing system of a vehicle to track agents detected in the vehicle's surrounding environment in real time. The first and second approaches disclosed herein may be utilized for other purposes as well.

Figure 4A:
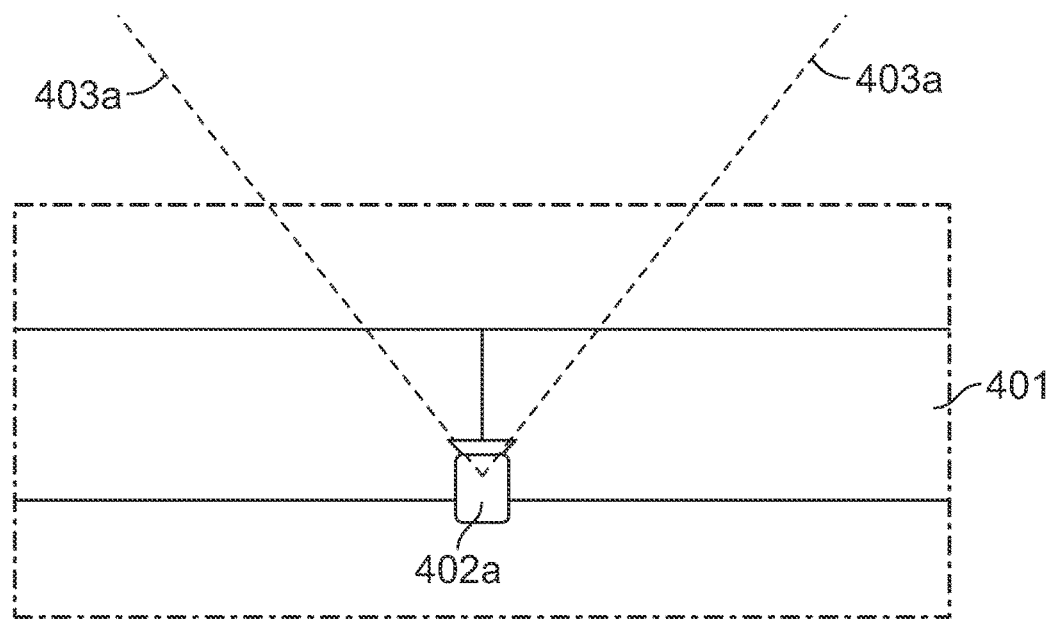
FIG. 4A is a simplified, top-down view of a vehicle's dashboard with a first example sensor hardware arrangement that may be utilized to facilitate collecting agent trajectories.

Turning now to FIG. 4A, a simplified, top-down view of a vehicle's dashboard is provided to illustrate one example sensor hardware arrangement that may be utilized to facilitate collecting agent trajectories. In this example, vehicle 401 is associated with a single monocular camera 402a, which may be embodied within device that has been mounted to the vehicle's dashboard, such as smartphone, a tablet, a dashcam, or the like (although as noted above, monocular camera 402a could alternatively be integrated with vehicle 401 or attached to or placed within vehicle 401 in some other manner). In practice, the position and orientation of monocular camera 402a relative to vehicle 401 may be known, such as from a calibration process or the like. As indicated by field-of-view lines 403a, monocular camera 402a is configured to capture image data that is representative of a portion of the vehicle's surrounding environment, which is typically dependent on the monocular camera's position and orientation. In operation, monocular camera 402a may be configured to capture images of the vehicle's surrounding environment according to a particular frame rate, such as 30 or 60 frames per second (fps), among other possibilities.

Example functions that may be performed to facilitate deriving agent trajectories will now be discussed in further detail. To help describe some of these functions, flow diagrams may be referenced to describe combinations of functions that may be performed. In some cases, each flow-diagram block may represent a module or portion of program code that includes instructions that are executable by at least one processor to implement specific logical functions or steps in a process. The program code may be stored on any type of computer-readable medium, such as non-transitory computer-readable media. Moreover, a person of ordinary skill in the art will appreciate that the blocks shown in the flow diagrams may be rearranged into different orders, combined into fewer blocks, separated into additional blocks, and/or removed based upon the particular embodiment.

Figure 5A:
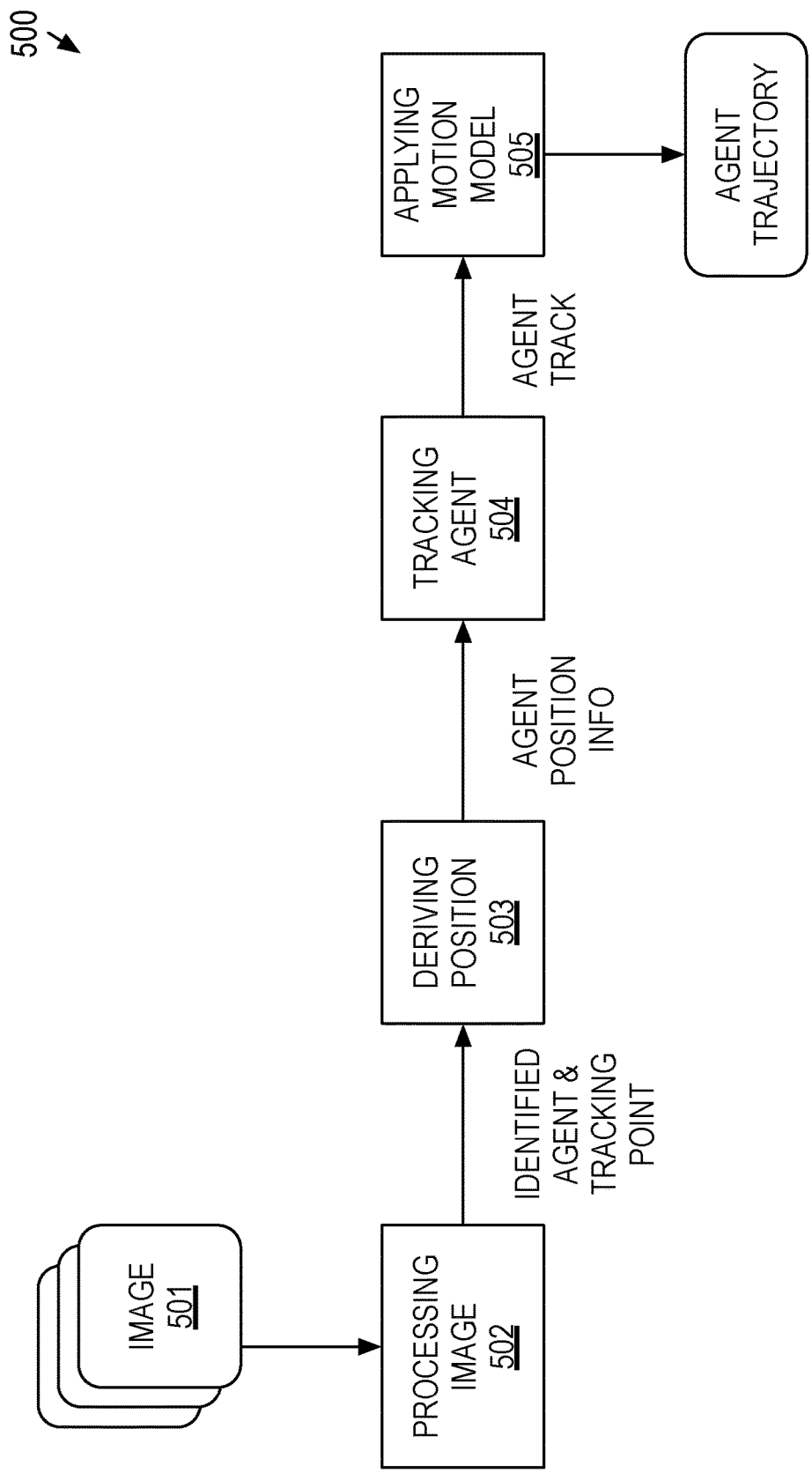
FIG. 5A is a simplified block diagram of an example pipeline that illustrates example functions that may be performed in the first approach for deriving agent trajectories described herein.

Turning now to FIG. 5A, an example pipeline 500 is illustrated to facilitate describing example functions that may be involved in deriving agent trajectories based on mono images captured by a monocular camera, such as monocular camera 402a of FIG. 4A, in accordance with the first approach disclosed herein. In practice, these functions may be performed by one or more computing systems of a vehicle (which may or may not be an autonomous vehicle), one or more remote computing systems, some combination thereof, or some other computer, among other possibilities.

As shown in FIG. 5A, pipeline 500 begins with receiving a mono image 501 representative of a portion of the vehicle's surrounding environment that may have been captured by a monocular camera (e.g., monocular camera 402a of FIG. 4A) associated with the vehicle. In practice, the monocular camera may capture a sequence of mono images 501 with each mono image 501 corresponding to a respective capture time.

At block 502, image processing functions may be performed on mono image 501. For example, one image processing function may involve identifying one or more agents represented in mono image 501. In example implementations, this function may involve identifying agents that belong to one or more particular object classes of interest, such as "vehicle" objects or other types of agents.

Identifying one or more agents represented in mono image 501 may be performed in a variety of manners. As one possibility, this function may involve applying one or more object-detection models to mono image 501 that are configured to output a respective pixel mask for each agent detected in mono image 501 that belongs to one or more particular object classes of interest (e.g., any "vehicle" object). Examples of such an object-detection model may include a Mask R-CNN or other instance segmentation object-detection model, among other possibilities.

Figure 6A:
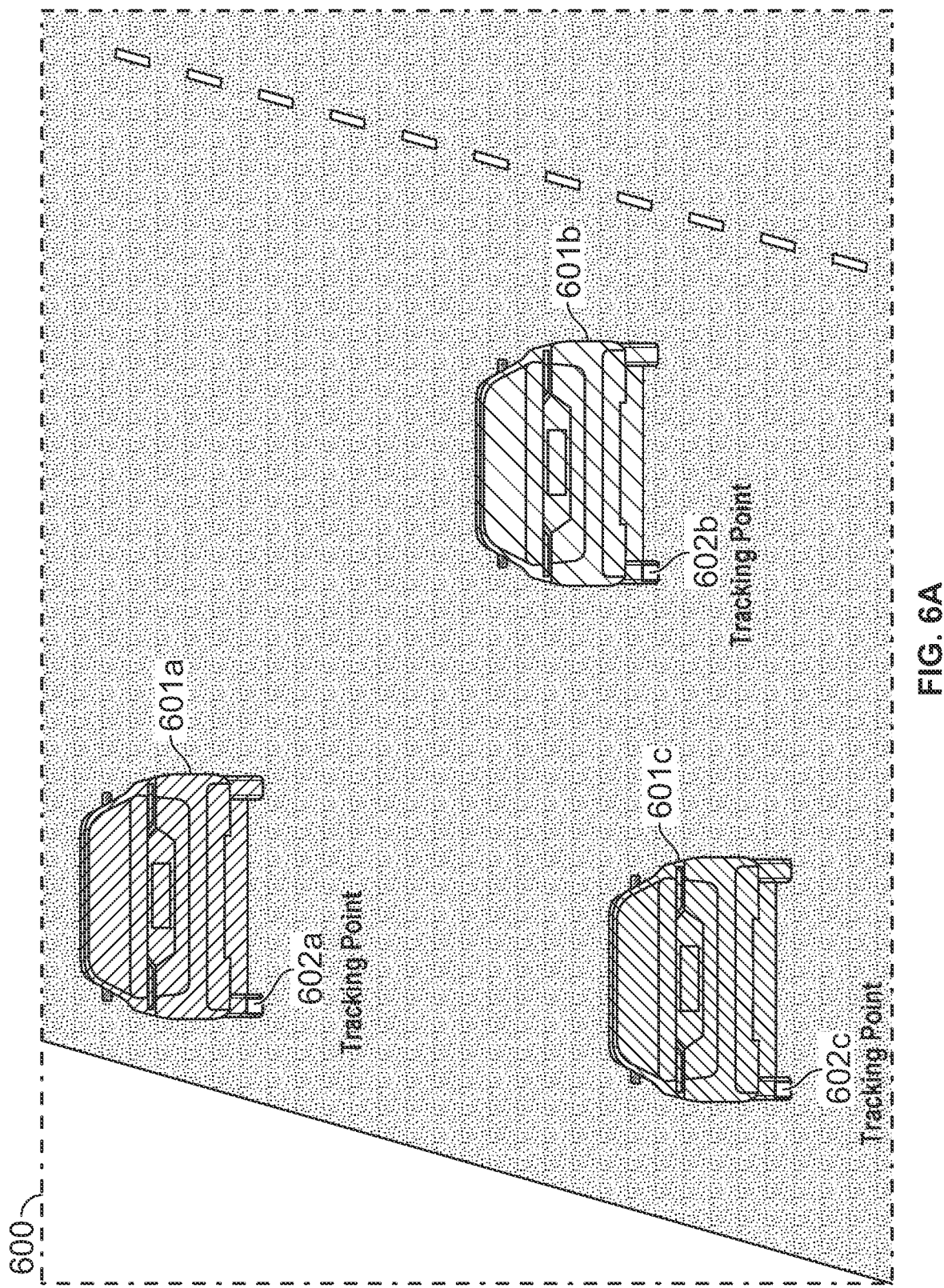
FIG. 6A is a conceptual illustration of an example output of an instance-segmentation object-detection model based on a mono image from a first point in time.

FIG. 6A provides a conceptual illustration of an example output 600 of such an object-detection model. As shown, an object-detection model processed a mono image from a particular capture time, detected three unique vehicle agents 601a, 601b, and 601c, and outputted a respective pixel mask for each of the three vehicles agents (indicated by the different fill patterns in vehicle agents 601a, 601b, and 601c).

Identifying one or more agents represented in mono image 501 may be performed in other manners as well, such as utilizing an R-CNN, Fast R-CNN, Faster R-CNN, or YOLO object-detection models that may output a respective bounding box for each identified agent, among other possibilities.

Back at block 502 of FIG. 5A, another example image processing function may involve identifying a respective tracking point for each of one or more agents identified within mono image 501. This function may be performed in a variety of manners.

For example, this function may involve, for each of one or more agents identified within mono image 501, designating a lowest-observed point of the agent as that agent's tracking point. As one particular example, the lowest-observed point may take the form of a lowest pixel in a generated pixel mask for an agent (e.g., a pixel in the generated pixel mask that is closest to the bottom of the image). In this respect, depending on the configuration of the generated pixel mask, there could be one single pixel that is vertically lower than the rest of the pixels within the generated pixel mask or there could be multiple pixels that are "tied" for being the vertically lowest pixel within the generate pixel mask, in which case a tiebreaking function may be performed in order to identify which of these pixels is identified as the tracking point for the agent. Utilizing a lowest pixel as a tracking point is advantageous not only in that it helps with the occlusion problem (as discussed and illustrated below) but also because the resolution in a mono image tends to be higher in the lower portion of the image than the upper portion due to the fact that real-world features that are closer to the monocular camera tend to appear in the lower portion of the image whereas real-world features that are farther away from the monocular camera tend to appear in the upper portion of the image.

In practice, designating the lowest pixel of an agent's pixel mask as that agent's tracking point may be performed in various manners. As one possibility, a lowest pixel of an agent's pixel mask (e.g., outputted by an instance segmentation object-detection model) may be identified by comparing the respective vertical position (e.g., in the y-direction) within mono image 501 of each pixel in the agent's pixel mask and then designating the pixel with the lowest vertical position as that agent's tracking point.

As another possibility, a lowest pixel of an agent's pixel mask may be identified based further on semantic segmentation. For instance, in addition to processing mono image 501 using an instance-segmentation model (as discussed with reference to the agent-identification function), a semantic-segmentation model may be applied to mono image 501 to identify any portion of mono image 501 that corresponds to a "ground" (or "street") feature. Examples of such an object-detection model may include an FCN, FastFCN, or other semantic-segmentation object-detection model, among other possibilities. After performing semantic segmentation, the lowest pixel in the agent's pixel mask that intersects, is adjacent to, or is otherwise closest to the ground feature identified within the mono image's pixel space may be designated as the given agent's tracking point.

Figure 6B:
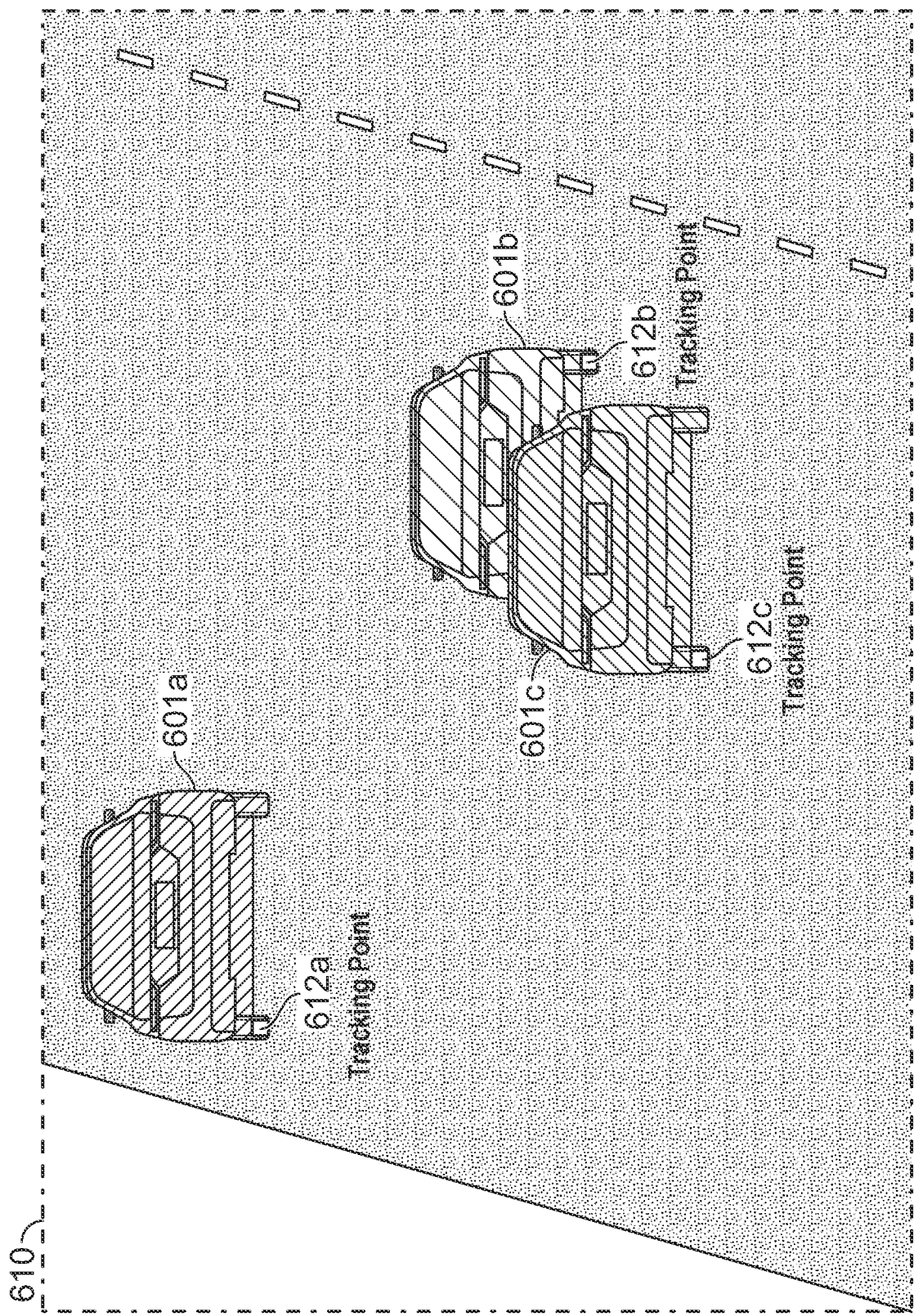
FIG. 6B is a conceptual illustration of an example output of an instance-segmentation object-detection model based on a mono image from a second point in time.

FIGS. 6A and 6B provide a conceptual illustration of this technique and its advantages. As shown in FIG. 6A, semantic segmentation identified the ground pixels of the image, as indicated by the speckled fill pattern. In turn, a pixel in the pixel mask of vehicle agent 601a adjacent to the ground pixels was designated as tracking point 602a, a pixel in the pixel mask of vehicle agent 601b adjacent to the ground pixels was designated as tracking point 602b, and a pixel in the pixel mask of vehicle agent 601c adjacent to the ground pixels was designated as tracking point 602c.

FIG. 6B provides a conceptual illustration of an example output 610 of an object-detection model after processing a second mono image that corresponds to an image captured next in sequence after the mono image corresponding to FIG. 6A. Similar to FIG. 6A, semantic segmentation identified the ground pixels of the second image, as indicated by the speckled fill pattern. Likewise, a pixel in the pixel mask of vehicle agent 601a adjacent to the ground pixels was designated as tracking point 612a, a pixel in the pixel mask of vehicle agent 601b adjacent to the ground pixels was designated as tracking point 612b, and a pixel in the pixel mask of vehicle agent 601c adjacent to the ground pixels was designated as tracking point 612c.

As yet another possibility, it may be possible to determine an association between mono image 501 and a ground map that provides information regarding the 3D geospatial geometry of the ground surface within the vehicle's surrounding environment (e.g., by localizing the camera pose associated with mono image 501 within the ground map), and the information from such a ground map may then be used to assist in the identification of a lowest pixel within an agent's pixel mask. For example, once an association between mono image 501 and a ground map is determined, it may be possible to use that association to assign a real-world elevation value to each pixel in mono image 501 that is representative of the ground plane (e.g., via a technique such as projection), and the pixel within an agent's pixel mask that that intersects, is adjacent to, or is otherwise closest to the ground pixel having the lowest real-world elevation value may be designated as the given agent's tracking point.

Notably, using any of the aforementioned techniques to identify a lowest-observed point facilitates establishing a tracking point for an agent in images where the agent was partially occluded, which is a scenario in which other techniques may be unable to establish a tracking point. For example, as shown in FIG. 6B, tracking point 612b for vehicle agent 601b was identified despite vehicle agent 601b being partially occluded by vehicle agent 601c. In contrast, FIGS. 7A and 7B provide a conceptual illustration of an alternate technique for identifying a respective tracking point for each of one or more agents identified within a mono image that is less robust than a technique that uses pixel masks produced by instance segmentation to identify the lowest-observed point.

Figure 7A:
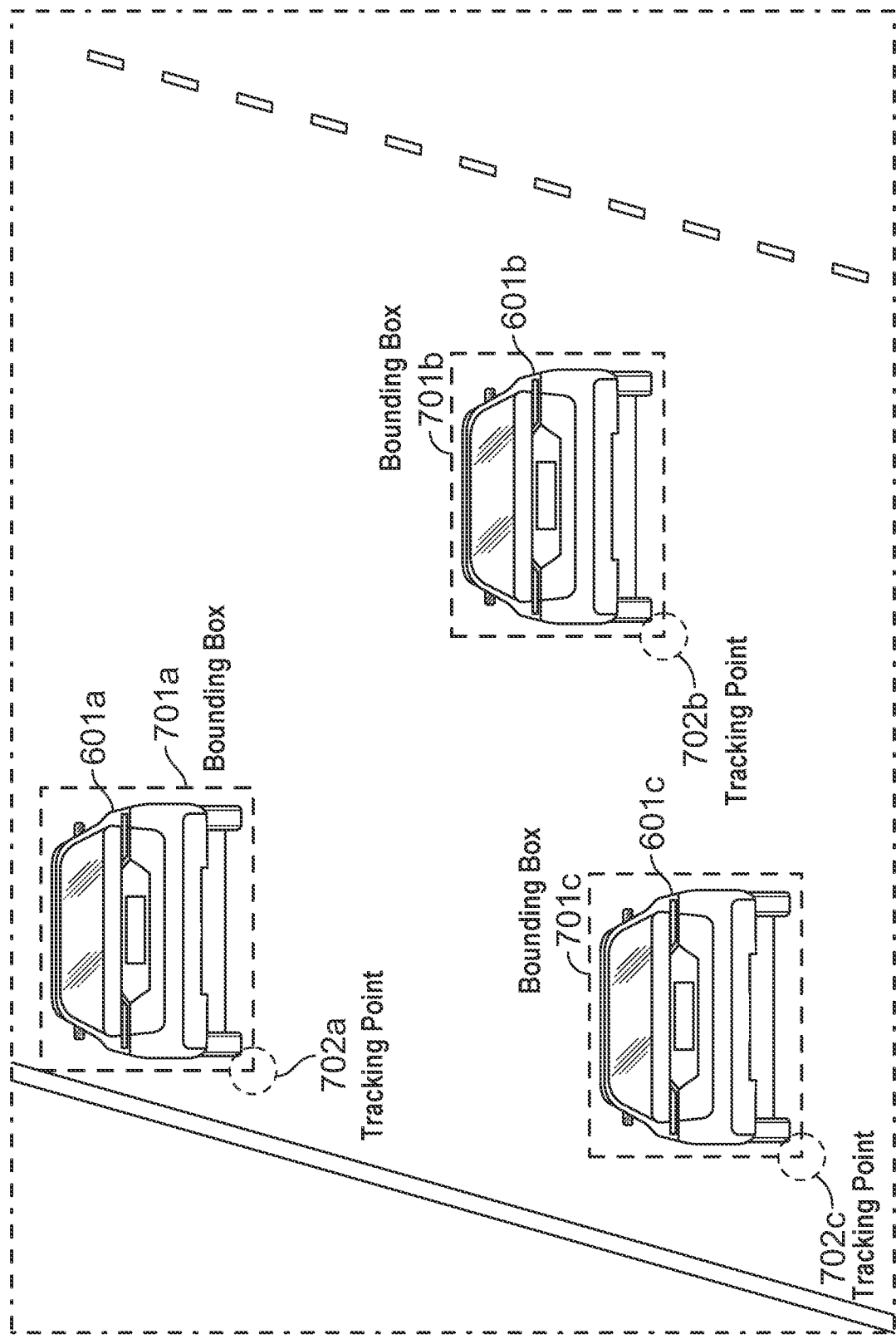
FIG. 7A is a conceptual illustration of an example output of a bounding-box object-detection model based on a mono image from a first point in time.

In particular, FIGS. 7A and 7B correspond to the same sequence of mono images as in FIGS. 6A and 6B but illustrate a bounding-box technique for identifying tracking points. As shown in FIG. 7A, each vehicle agent 601a, 601b, and 601c is identified by a respective bounding box 701a, 701b, and 701c and a particular point within each bounding box (e.g., the lower, left corner) is selected as a tracking point 702a, 702b, and 702c. Compared to the pixel masks in FIGS. 6A and 6B, these bounding boxes do not provide specific information regarding the respective agent's outline within the mono image (e.g., the bounding box is not as "tight" to the agent as a pixel mask is), and when an agent is at least partially occluded in an image (e.g., vehicle agent 601b in FIG. 7B), it may not be possible for a bounding box (and consequently, a tracking point) to be generated for the agent. Thus, in a series of images that includes some images where an agent is at least partially occluded (e.g., as in FIG. 7B), the agent's bounding box and tracking point may "disappear" for such images, which may result in inaccurate agent tracking.

Returning to FIG. 5A, information regarding each of one or more agents identified in mono image 501 (including the agent's corresponding tracking point) is provided as input to block 503, where position information is derived for each such agent based on the agent's tracking point within mono image 501. In order to derive an agent's position information based on the agent's tracking point within mono image 501, a position of the agent's tracking point may first be determined using a technique that accounts for the depth of the agent's tracking relative to the monocular. This function may take various forms.

According to one implementation, the function of a determining a position of the agent's tracking point identified within mono image 501 may involve (i) localizing the capture pose of mono image 501 (i.e., the pose of the monocular camera at the time that it captured mono image 501) within a ground map that provides information regarding the 3D geospatial geometry of the ground surface within the vehicle's surrounding environment, (ii) determining an association between the agent's tracking point within mono image 501 and a given ground point within the vehicle's surrounding environment (e.g., by casting a ray through the agent's tracking point within mono image 501), and then (iii) designating the 3D position for the given ground point that is encoded into the ground map as the 3D position of the agent's tracking point. In this respect, it should be understood that the determined 3D position of the agent's tracking point will be represented in terms of the ground map's coordinate frame and thus does not provide a direct measure of the depth of the agent's tracking point relative to the monocular camera, but that the determined 3D position of the agent's tracking point nevertheless incorporates an estimate of the depth the agent's tracking point relative to the monocular camera and that this estimated depth could be directly determined, if desired, by translating the 3D position of the agent's tracking point from the ground map's coordinate frame to the camera coordinate frame of the monocular camera using the pose of the monocular camera at the time that mono image 501 was captured. It should also be understood that, after determining the 3D position of the agent's tracking point in this manner, the determined 3D position could also be translated from the ground map's coordinate frame to some other world coordinate frame that is to be used for representing agent trajectories (e.g., a local or global map coordinate frame).

Figure 8A:
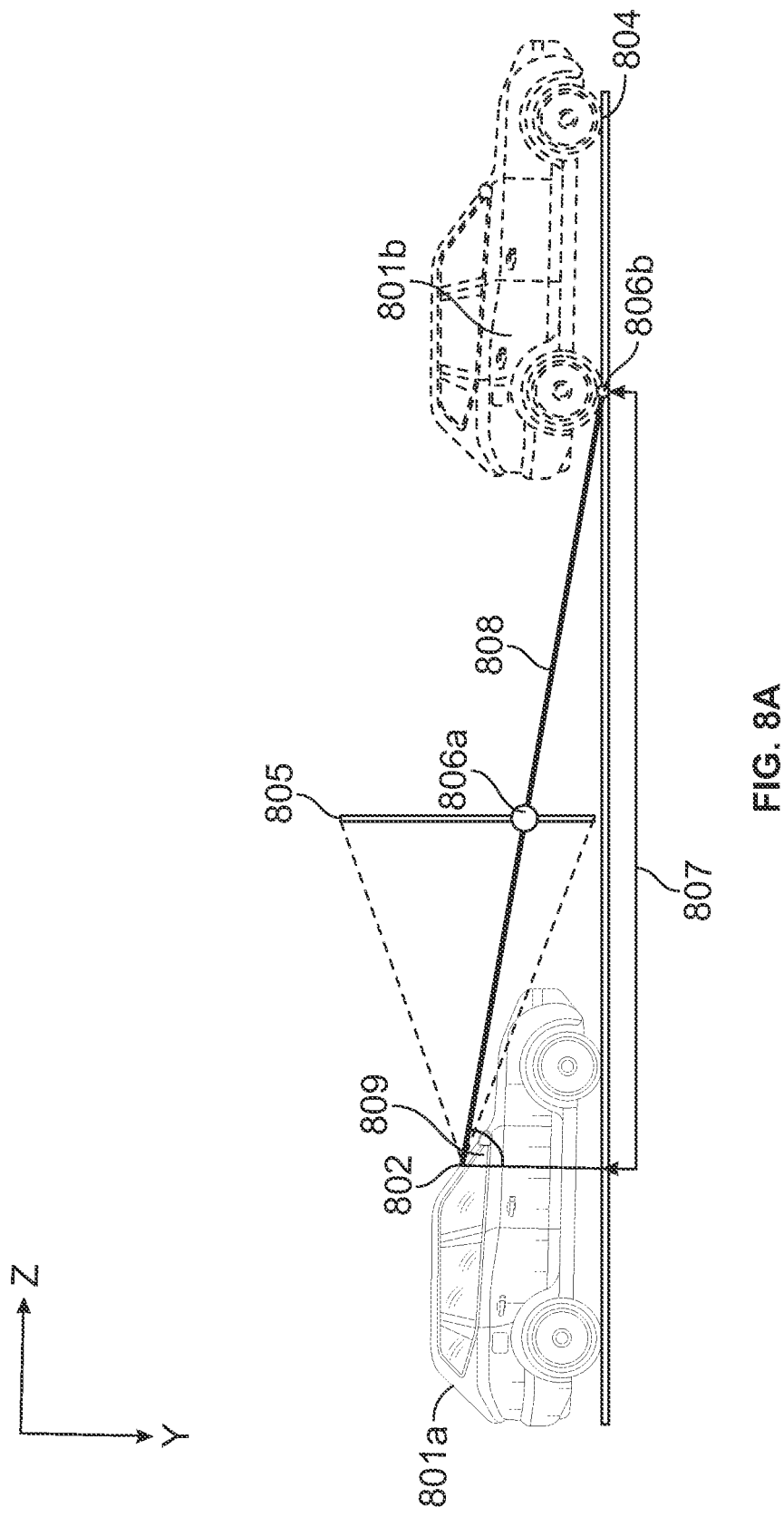
FIG. 8A is a conceptual illustration of an example ray-casting technique for deriving agent depth information.
Figure 8B:
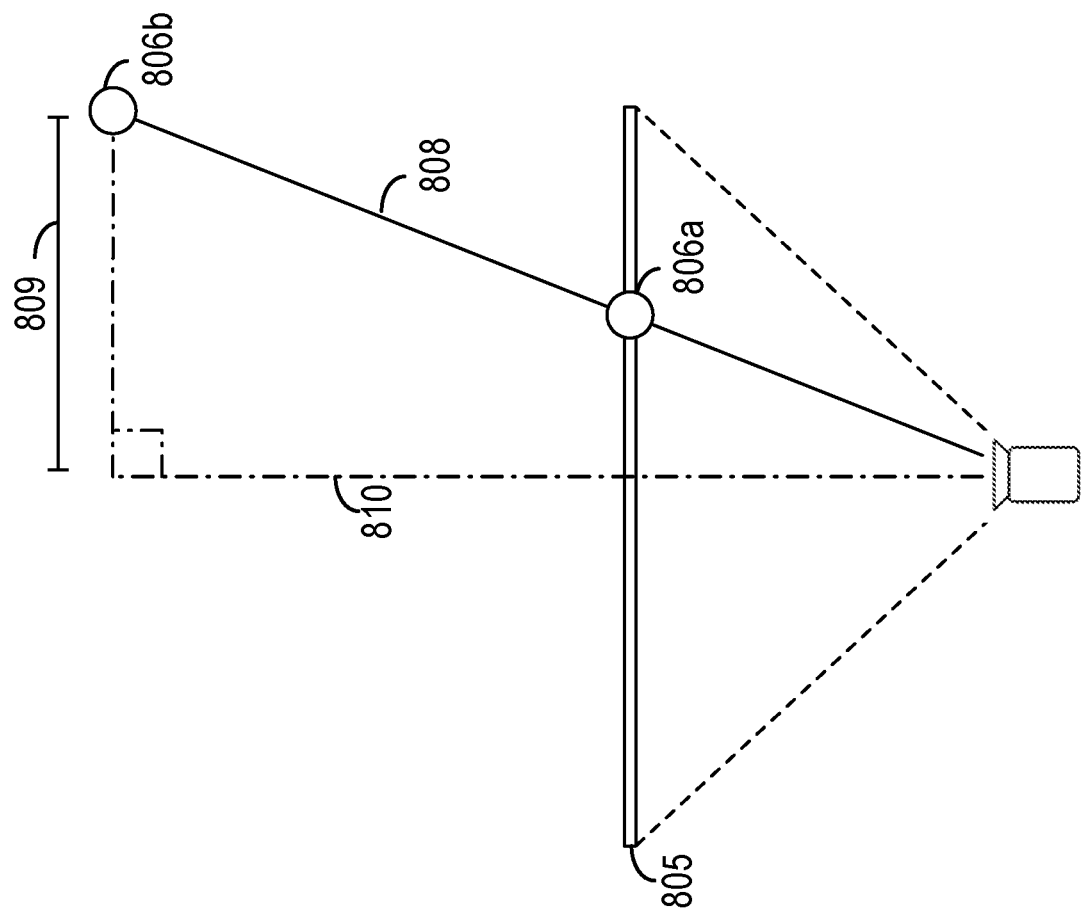
FIG. 8B is a conceptual illustration of an example technique for deriving agent horizontal position information.

FIGS. 8A-B provides a conceptual illustration of one example of this implementation for deriving a position of the agent's tracking point within mono image 501. Beginning with FIG. 8A, a monocular camera associated with vehicle 801a is shown to have captured a mono image 805 at a time when monocular camera had a given pose 802, where mono image 805 contains a representation of an agent 801b (e.g., another vehicle) for which tracking point 806a was identified as that agent's lowest-observed point (e.g., a pixel closest to ground plane 804) in mono image 805. In order to determine a position of tracking point 806a in a manner that accounts for the tracking point's depth relative to the monocular camera, pose 802 of the monocular camera may first be used to localize the monocular camera within a ground map that provides information regarding the 3D geospatial geometry of ground plane. Next, a given ground point along ground plane 804 that is associated with tracking point 806a within mono image 805 may be determined using a technique such as raycasting. For example, as shown in FIG. 8A, a ray 808 is cast from monocular camera through tracking point 806a in mono image 805, and information regarding ray 808 (e.g., angle 809) and the 3D geospatial geometry of ground plane 804 may then be used to identify a particular ground point 806b along ground plane 804 that is associated with tracking point 806a. Once associated ground point 806b is determined, the 3D position of ground point 806b within the ground map's coordinate frame may be designated as the 3D position of the agent's tracking point 806a. In this respect, as shown in FIG. 8A, this 3D position of the agent's tracking point advantageously incorporates an estimate of the depth 807 of the agent's tracking point 806a relative to the monocular camera, which is information that is not otherwise available from mono image 805 itself.

Turning to FIG. 8B, a top-down view of the plan view shown in FIG. 8A is illustrated. As shown in FIG. 8B, the 3D position of the ground point 806b that is determined to be associated with tracking point 806a in mono image 805 also incorporates an estimate of the lateral displacement 809 of ground point 806b relative to the monocular camera's optical axis 810.

According to another implementation, the function of determining a position of the agent's tracking point identified within mono image 501 may involve (i) inputting mono image 501 and an identification of the agent's tracking point into a machine learning model (e.g., a neural network) that has been trained to estimate and output a 3D position of a given ground point appearing within a mono image, where this estimated 3D position is represented according to the camera coordinate frame of the monocular camera (e.g., the 3D position relative to the monocular camera's optical center), and then (ii) using the pose of the monocular camera at the time that mono image was captured, which may be represented according to a given world coordinate system (e.g., a local or global map coordinate frame), to translate the estimated 3D position of the agent's tracking point output by the machine learning model from the camera coordinate frame of the monocular camera to the given world coordinate frame. In this respect, it should be understood that, while the determined 3D position of the agent's tracking point will be represented in terms of the given world coordinate system according to which the monocular camera's pose is represented, this determined 3D position of the agent's tracking point nevertheless incorporates an estimate of the depth the agent's tracking point relative to the monocular camera. Further, it should also be understood that, after determining the 3D position of the agent's tracking point in this manner, the determined 3D position could also be translated from the given world coordinate frame according to which the monocular camera's pose is represented to some other coordinate frame that is to be used for representing agent trajectories.

Other techniques for determining a position of the agent's tracking point identified within mono image 501 are possible as well.

In example implementations, after determining the position of the agent's tracking point, the function of deriving the position information for the agent may further involve translating the determined position of the agent's tracking point to a position of an estimated center point of the agent, which may provide for more robust tracking of the agent across a sequence of mono images. In practice, translating the position of the agent's tracking point to a position of an estimated center point of the agent may be based on (i) the determined position of the agent's tracking point and (ii) one or more estimated physical dimensions of the agent (e.g., an estimated width, length, and height of a typical vehicle). For instance, this function may involve (i) identifying one or more estimated physical dimensions of the agent, (ii) estimating a center point of the agent comprising the identified one or more estimated physical dimensions, and (iii) translating the determined position of the agent's tracking point—which may correspond to a point where a portion of the agent such as a back tire intersects with the ground—to the estimated center point of the agent. Other techniques for translating a determined position of an agent's tracking point to a position of an estimated center point of the agent are also possible. In any case, this function may serve to identify a standardized point of reference for the agent that can be evaluated from image to image.

The function of deriving an agent's position information based on the agent's tracking point within mono image 501 may take various other forms as well.

Returning to FIG. 5A, as noted above, the monocular camera typically captures a sequence of mono images 501, and consequently, the functions described above with reference to blocks 502 and 503 are typically performed on each mono image 501 in that sequence of mono images 501. As shown in FIG. 5A, the agent information that is determined across the sequence of two more mono images 501 (e.g., the agent tracking points and/or corresponding agent position information) may then be provided as input to block 504, where an evaluation is then performed on such agent information in order to determine which agent information corresponds which different agent from image to image and then associate each different agent's respective set of agent information across the sequence of mono images 501 together into a respective track for the agent, which may take the form of a time sequence of position information for the agent (and perhaps also other state information for the agent such as orientation, velocity, and/or acceleration information). In operation, this agent tracking function at block 504 may begin after at least two images have passed through blocks 502 and 503 or may begin after all images from a particular period of driving have passed through blocks 502 and 503, among other possibilities.

In practice, evaluating the derived agent information across a sequence of images to generate a respective track for each identified agent may be performed in a variety of manners. As one possibility, this function may generally involve (i) identifying a relationship between first position information derived from a first mono image and second position information derived from a second mono image, where the relationship indicates that the first and second position information are associated with the same agent, and then (ii) generating a track for the agent that includes a time-sequence compilation of position information that was deemed to have a relationship.

As one particular example, identifying a relationship between image-specific position information may involve starting with (i) a first mono image (e.g., mono image 501) in which a given agent was identified and (ii) an estimated center point of the given agent. Next, an evaluation is performed on a second mono image that was captured next in sequence after the first mono image in order to identify a candidate object represented in the second mono image that is closest to the estimated center point from the first mono image. This step assumes that the monocular camera has a high enough frame rate (e.g., 60 fps) that a given agent moves only incrementally between the time a first image is captured and a second image is captured. Lastly, first position information for the given agent from the first mono image is associated with second position information of the candidate object from the second mono image such that the first and second position information are deemed to be related to the same agent (e.g., the given agent and the candidate object are the same agent).

Other techniques for identifying a relationship between image-specific position information from multiple mono images are also possible, such as by evaluating similarity in one or more characteristics of pixel masks from one image to another, among other possibilities.

In example embodiments, after associating position information across multiple mono images for a given agent, other types of state information may also be derived that can form part of the given agent's track, such as agent orientation, velocity, and/or acceleration information. For example, velocity and/or acceleration information can be derived based at least in part on the frame rate at which the monocular camera was capturing images and the position change of a given agent from one image to the next. Other manners of deriving state information are also possible.

Figure 9A:
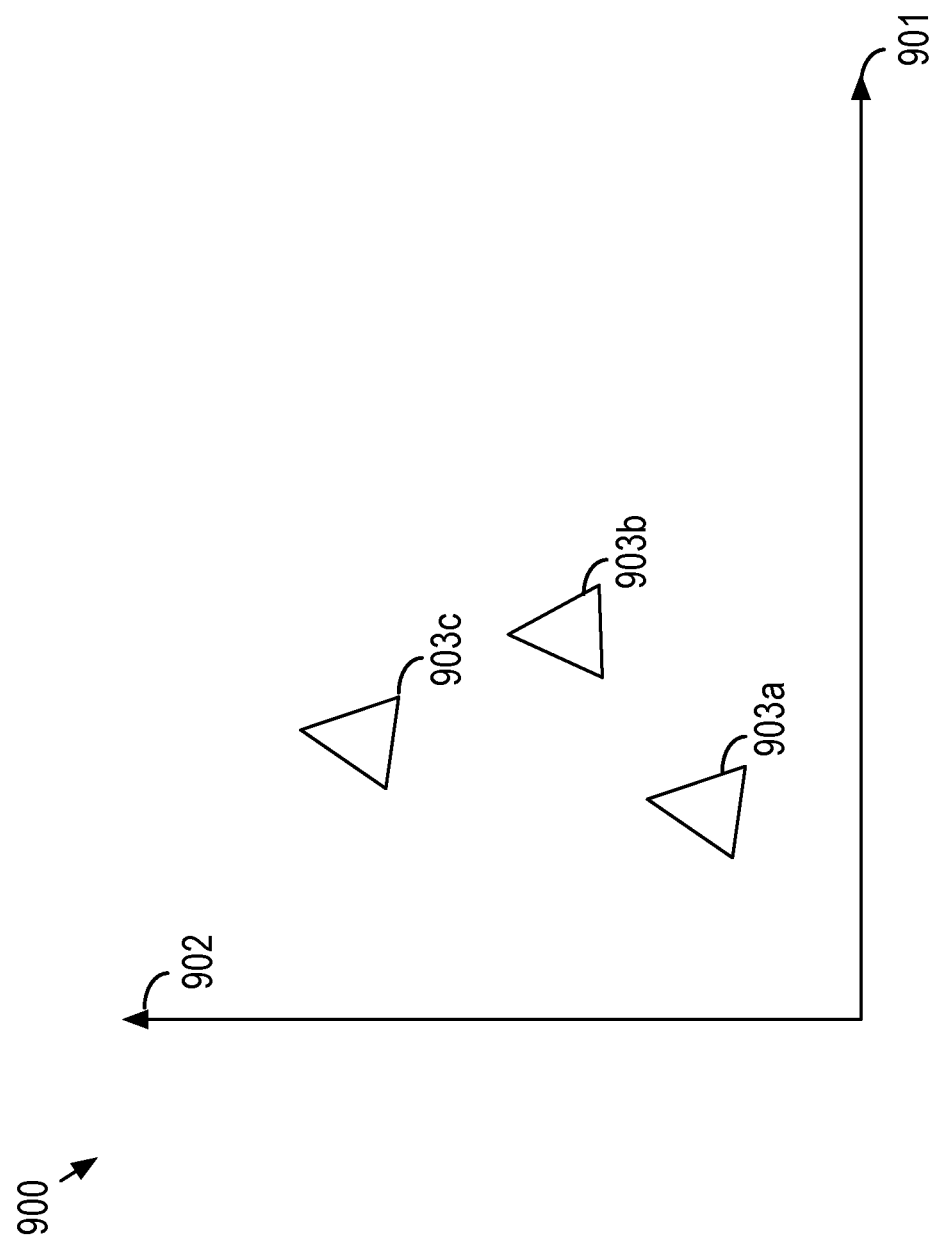
FIG. 9A is a simplified, two-dimensional representation of a derived track for an agent.

FIG. 9A provides a simplified, two-dimensional representation of a derived track for an agent. As shown, in plot 900, a first axis 901 corresponds to a first horizontal dimension of a given world coordinate frame and a second axis 902 corresponds to a second horizontal dimension of the given world coordinate frame. In this example, triangles 903a, 903b, and 903c represent position information (as well as orientation information) for the agent that were derived from three consecutive mono images captured at times $t_a$, $t_b$, and $t_c$ with the front tip of each triangle (indicated by the triangle vertex pointing toward axis 902) representing the direction that the agent was facing at the given point in time. These three triangles 903a, 903b, and 903c represent the track that was derived for the agent at block 504 of FIG. 5A.

Returning to FIG. 5A, at block 505, the derived track for each given agent may be provided as input to a motion model that encodes information about the expected real-world motion behavior of an agent of the same type as the given agent (e.g., physics-based constraints on how an agent of a given type is capable of moving in the real world). In this respect, applying such a motion model to the derived track for a given agent may correct for errors that may been introduced into that derived track as a result of occlusions or other measurement problems, such as gaps in the track where position information for the given agent is missing and/or position information for the given agent that is not consistent with how the given agent would have physically been capable of moving within the real world. In this way, applying the motion model to the given agent's derived track may produce a trajectory for the given agent that takes the expected real-world motion behavior of the given agent into account and provides a more accurate representation of the given agent's real-world pose evolution over time.

To illustrate with an example, it is possible that the tracking point of a given agent might correspond to a different physical point on the given agent from one mono image to the next mono image—which is illustrated in FIGS. 6A and 6B for vehicle agent 601b—and this difference between tracking points may result in a situation where the derived the track for the given agent may indicate unrealistic real-world movement of the given agent over time. For instance, as shown in FIG. 9A, the agent as represented by triangle 903a (which may correspond to the agent's tracking point being on the vehicle's left tire, like tracking point 602b of vehicle agent 601b in FIG. 6A) may unrealistically "jump" to the right as represented by triangle 903b (which may correspond to the agent's tracking point being on the vehicle's right tire, like tracking point 612b of vehicle agent 601b in FIG. 6B). Thus, the motion model helps to remove such unrealistic characteristics in the agent's track, as well as to fill any gaps in the track caused by missing position estimates.

In practice, applying a motion model may be performed in a variety of manners and various types of motions models may be utilized to output an estimated trajectory for a given agent. As one possibility, a Kalman filter may be utilized that receives a derived track for a given agent in the form of a time-sequence of position states for the given agent (perhaps along with corresponding velocity states), applies pre-encoded knowledge about the expected real-world motion behavior of an agent of the same type as the given agent, and then outputs a revised time-sequence of position states for the given agent (perhaps along with other state information such as corresponding orientation states, velocity states, and/or acceleration states), which may then be designated as the given agent's trajectory.

To illustrate, FIG. 9B provides a simplified, two-dimensional representation of a trajectory that is output by a motion model for the agent represented in FIG. 9A. As shown in plot 910, the motion model (e.g., a Kalman filter) outputted a trajectory represented by triangles 913a, 913b, and 913c that provides a more accurate representation of the agent's pose evolution over time compared to the representation provided by triangles 903a, 903b, and 903c from FIG. 9A.

Although not depicted here, in practice, the motion model may also output a predicted pose for the agent at a next point in time (e.g., time $t_d$) based on the prior derived measurements represented by triangles 903a, 903b, and 903c and/or the motion model's outputted trajectory for the agent represented by triangles 913a, 913b, and 913c. The motion model may then update this predicted pose for the next point in time after state information is derived for the agent based on a mono image that is captured at that next point in time (e.g., time $t_d$).

In some implementations, a Kalman filter may be utilized that may also receive respective weights that are to be applied to the different dimensions of the position information included in the derived track. For instance, when applying the Kalman filter, a dimension of the position information for the given agent that corresponds to the lateral displacement of the given agent relative to the monocular camera may be given more weight than a dimension of the position information for the given agent that corresponds to the depth of the given agent relative to the monocular camera, which reflects the fact that position information derived from mono images tends to reflect the lateral displacement of an agent relative to the monocular camera more accurately than it reflect the depth of an agent relative to the monocular camera. In this respect, it should be understood that the track that is input into the motion could be represented in the camera coordinate frame of the monocular camera instead of a world coordinate frame to facilitate the weighting along these dimensions, in which case deriving the trajectory of the given agent may involve an additional function of translating the poses included in the trajectory from the camera coordinate frame to a world coordinate frame. Other manners of weighting the position information of an agent within the motion model are also possible.

Other manners of applying a motion model to a derived track and other types of motion models are also possible.

Figure 10:
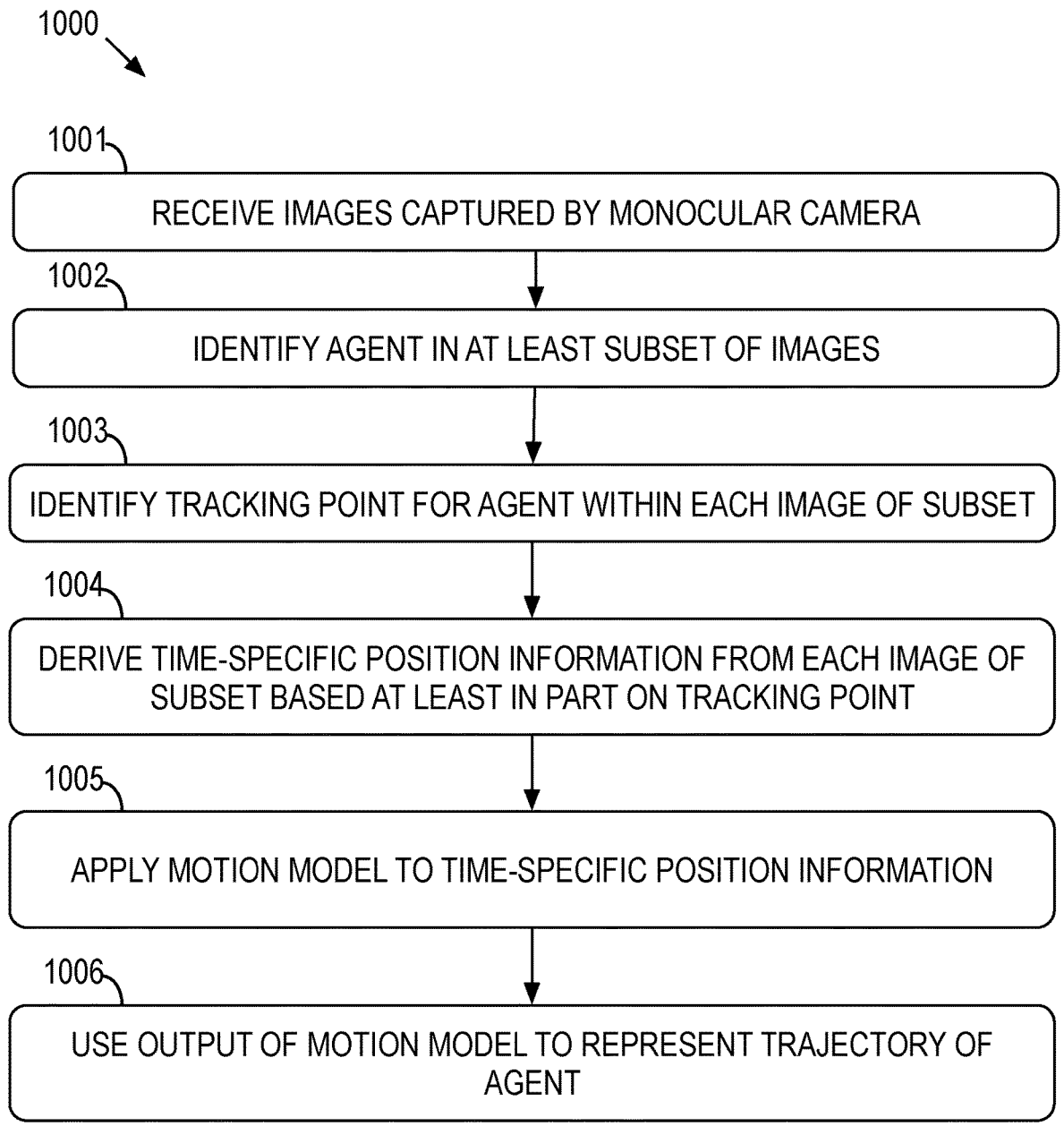
FIG. 10 is a flow diagram illustrating one example set of functions that may be performed to derive agent trajectories based on images from a monocular camera.

To summarize the aforementioned first approach for deriving agent trajectories based on images from a monocular camera, FIG. 10 provides a flow diagram 1000 illustrating one example set of functions that may be performed to derive such agent trajectories. At block 1001, a computing system receives a sequence of images captured by a monocular camera (e.g., monocular camera 402a of FIG. 4A), where each image in the sequence is representative of a vehicle's surrounding environment at a respective time. At block 1002, the computing system identifies a given agent (e.g., another vehicle) in at least a subset of the images in the sequence by generating a respective pixel mask for the given agent within each image in the subset. At block 1003, the computing system identifies a respective tracking point for the given agent within each image in the subset that comprises a lowest-observed point of the respective pixel mask for the given agent. At block 1004, the computing system derives a respective set of time-specific position information for the given agent from each image in the subset based at least in part on the respective tracking point for the given agent within each image in the subset, where the time-specific position information incorporates an estimate of the given agent's depth relative to the monocular camera. At block 1005, the computing system applies a motion model (e.g., a Kalman filter) to the respective set of time-specific position information for the given agent that is derived from the images in the subset. At block 1006, the computing system uses an output of the motion model to represent a trajectory of the given agent. Other sets of functions may instead be performed to derive agent trajectories based on images from a monocular camera, which may involve adding to, removing from, or consolidating functions from flow diagram 1000.

This first approach for deriving agent trajectories is advantageous in that the requisite hardware (e.g., a single monocular camera) is already widely available and there are relatively low costs in terms of adding this requisite hardware to vehicles, which makes this approach widely deployable in many vehicles. Moreover, by applying a motion model to the lowest-observed point for an agent within each mono image in which the agent appears, this first approach provides a way to derive a trajectory for an agent from mono images that is based on a more accurate estimate of the agent's depth relative to the monocular camera and is also less susceptible to missing or errant position estimates caused by occlusion, which helps improve upon existing techniques for deriving agent trajectories from mono images (e.g., as shown and described above with reference to FIGS. 9A and 9B).

Agent trajectories derived using this first approach may then be used for any of a variety of purposes, including but not limited to any of the purposes described above (e.g., to help improve facilitate operations carried out by on-board computing systems of vehicles or transportation-matching platforms).

As discussed before, while less widely available than a single monocular camera, another relatively inexpensive sensor system that could be available for use in collecting agent trajectories may comprise a pair of two cameras that have been arranged into a stereo configuration (which as noted above may be referred to as a "stereo camera") along with telematics sensors. In this respect, a second approach will now be discussed for deriving agent trajectories from sensor data that is captured by a vehicle that is associated with both a monocular camera and also a stereo camera, which may further enhance the accuracy of the agent trajectories collected by such vehicles while at the same time still providing a more scalable approach than one that relies on vehicles installed with expensive LiDAR-based sensor systems.

Figure 4B:
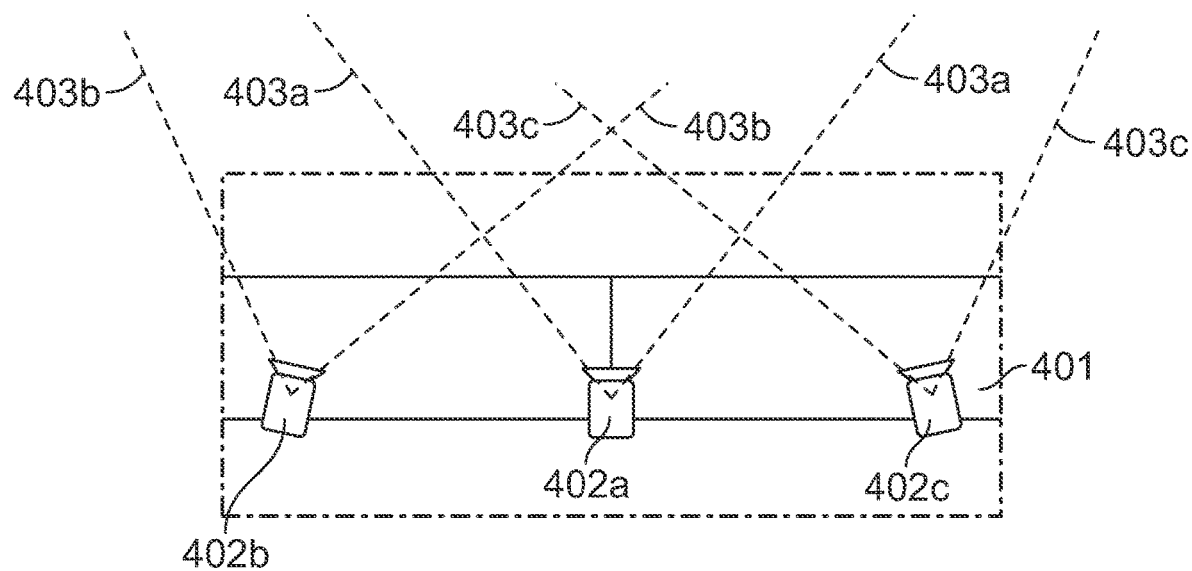
FIG. 4B is a simplified, top-down view of a vehicle's dashboard with a second example sensor hardware arrangement that may be utilized to facilitate collecting agent trajectories.

To illustrate, FIG. 4B provides a top-down view of a vehicle's dashboard with an example sensor hardware arrangement that may be utilized to facilitate collecting agent trajectories in accordance with this second approach. In this example, in addition to vehicle 401 being equipped with monocular camera 402*a*, vehicle 401 is also equipped with a stereo camera comprised of left stereo camera 402*b* and right stereo camera 402*c*, which may be embodied within one or more devices that are mounted to the vehicle's dashboard (although as noted above, stereo cameras 402*b* and 402*c* could alternatively be integrated with vehicle 401 or attached to or placed within vehicle 401 in some other manner). In practice, the position and orientation of each camera 402*a*, 402*b*, and 402*c* relative to vehicle 401 is known, such as from a calibration process or the like, along with respective distances between the cameras (e.g., the spacing between left stereo camera 402*b* and right stereo camera 402*c* is known).

As indicated by field-of-view lines 403*a*, monocular camera 402*a* has a first field of view (e.g., a center field of view) and is configured to capture image data that is representative of a first portion of the vehicle's surrounding environment. As indicated by field-of-view lines 403*b*, left stereo camera 402*b* has a second field of view (e.g., a left-side field of view) that at least partially overlaps with the first field of view and is configured to capture image data that is representative of a second portion of the vehicle's surrounding environment. And, as indicated by field-of-view lines 403*c*, right stereo camera 402*c* has a third field of view (e.g., a right-side field of view) that at least partially overlaps with the first field of view and is configured to capture image data that is representative of a third portion of the vehicle's surrounding environment. As shown, the left and right cameras' respective fields of view typically partially overlap with one another as well.

In operation, monocular camera 402*a* may be configured to capture images of the vehicle's surrounding environment according to a first frame rate (e.g., 60 fps) and left stereo camera 402*b* and right stereo camera 402*c* may be configured to capture images of the vehicle's surrounding environment according to a second frame rate that may be the same or different from the first frame rate. In any case, left stereo camera 402*b* and right stereo camera 402*c* typically operate at the same frame rate as one another, and left stereo camera 402*b* captures a left image of the vehicle's surrounding environment and right stereo camera 402*c* captures a right image of the vehicle's surrounding environment at approximately the same time. As noted above, a given pair of images captured by left stereo camera 402*b* and right stereo camera 402*c* at a given point in time may be referred to as a "stereo image."

Although the example sensor hardware arrangement illustrated in FIG. 4B comprises a pair of cameras in a stereo configuration (e.g., left stereo camera 402*b* and right stereo camera 402*c*) in addition to monocular camera 402*a*, another example sensor hardware arrangement for this second approach could comprise monocular camera 402*a* serving as one part of the stereo configuration such that only two cameras are utilized. Other configurations may also be possible.

Figure 5B:
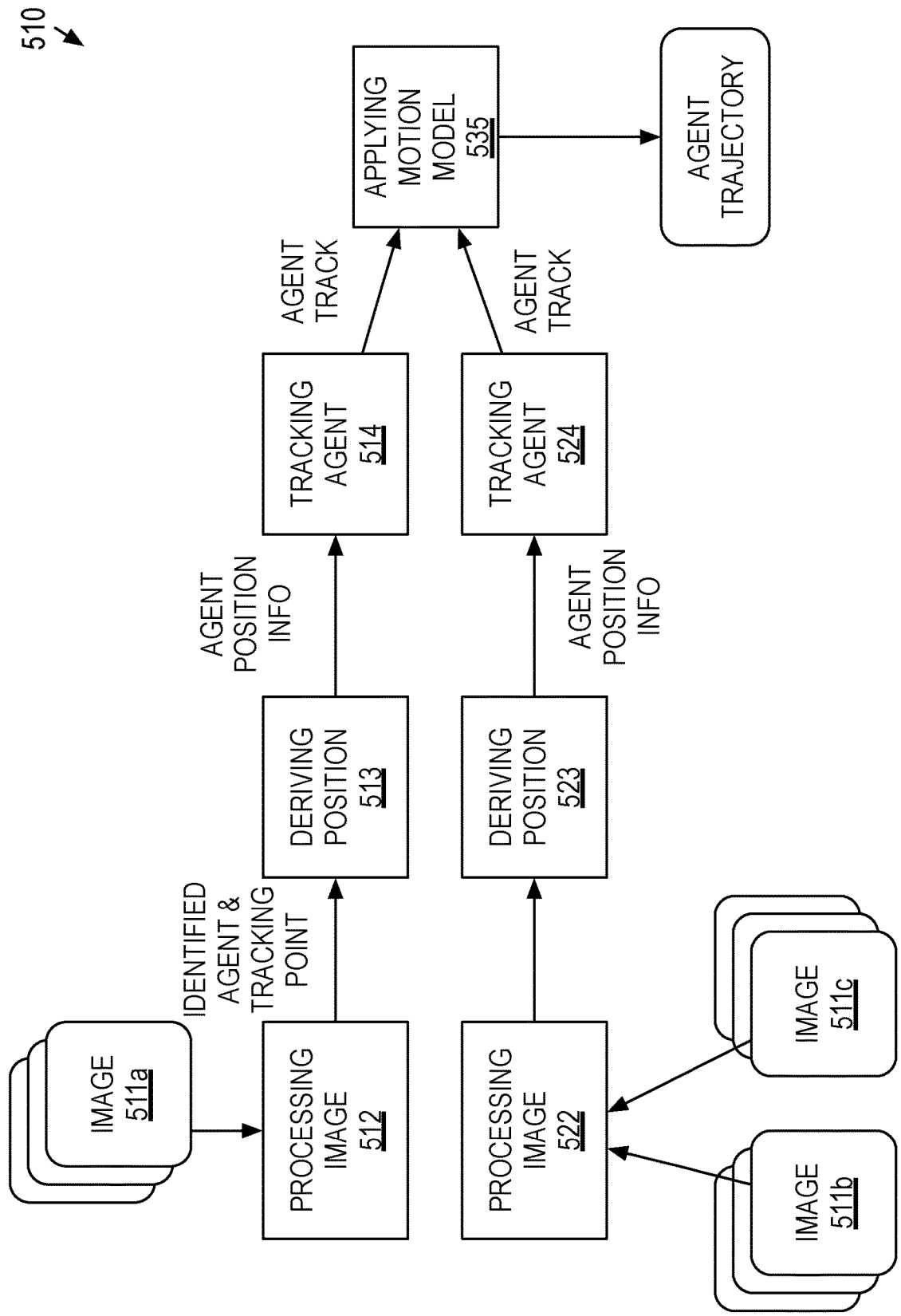
FIG. 5B is a simplified block diagram of an example pipeline that illustrates example functions that may be performed in the second approach for deriving agent trajectories described herein.

Turning now to FIG. 5B, an example pipeline 510 is illustrated to facilitate describing example functions that may be involved in deriving agent trajectories based on a combination of a mono and stereo images in accordance with the second approach disclosed herein. In practice, these functions may be performed by one or more computing systems of a vehicle (that may or may not be an autonomous vehicle), one or more remote computing systems, some combination thereof, or some other computer, among other possibilities.

As shown in FIG. 5B, pipeline 510 may involve receiving a mono image 511*a* representative of a portion of the vehicle's surrounding environment that may have been captured by a monocular camera (e.g., monocular camera 402*a* of FIG. 4B) associated with the vehicle. In practice, the monocular camera may capture a sequence of mono images 511*a* with each mono image 511*a* corresponding to a respective capture time.

At blocks 512, 513, and 514, functions may be performed on the sequence of mono images 511*a* in a manner similar to that described above with respect to pipeline 500 of FIG. 5A. In this respect, at block 512, image processing functions may be performed on mono image 511*a*, such as identifying one or more agents represented in mono image 511*a* and identifying a respective tracking point for each such agent (e.g., by designating a lowest-observed pixel of an agent's pixel mask as that agent's tracking point). At block 513, position information may be derived for each agent identified in each respective mono image 511*a* based on the agent's tracking point within the respective mono image 511*a*. And then, at block 514, an evaluation is performed on such agent information (e.g., the derived position information) in order to determine which agent information corresponds which different agent from mono image to mono image and then associate each different agent's respective set of agent information across the sequence of images together into a respective first track for the agent (which may be referred to as a "mono track") that comprises a time-sequence of the position information for the agent (and perhaps also orientation, velocity, and/or acceleration information) that has been derived from the mono images. Each agent's mono track is then provided as input to block 535 where a motion model is applied to fuse the agent's mono track together with a second track for the agent that is derived from stereo images (which may be referred to as a "stereo track") in the manner discussed below.

Turning now to the other portion of pipeline 510, at block 522, a sequence of stereo images may be received that each comprise a respective left image 511*b* and a respective right image 511*c* that are representative of a portion of the vehicle's surrounding environment that may have been captured by a stereo camera (e.g., left stereo camera 402*b* and right stereo camera 402*c* of FIG. 4B) associated with the vehicle. In practice, the stereo camera may capture a sequence of stereo images with each stereo image corresponding to a respective capture time. In this example, mono image 511*a* and the stereo image comprising left image 511*b* and right image 511*c* may have been captured at the same capture time or at approximately the same capture time.

At block 522, image processing functions may then be performed on each stereo image comprising respective left and right images 511*b* and 511*c* in order to identify agents of interest represented in the stereo image. In example implementations, this function may involve identifying agents that belong to one or more particular object classes of interest, such as "vehicle" objects or other types of agents.

Identifying one or more agents represented in the stereo image may be performed in a variety of manners, such as one of the techniques discussed above with reference to block 502 of FIG. 5A. For instance, this function may involve applying one or more object-detection models to the stereo image (e.g., instance segmentation or semantic segmentation models) that are configured to output a label for each agent detected in the stereo image that belongs to a particular agent class (e.g., each "vehicle" agent), where this label may take any of various forms. As one example, the label for a given agent detected in a stereo image may comprise a pair of 2D pixel masks for the given agent that includes a first 2D pixel mask derived from left image 511*b* (e.g., a left pixel mask) for the given agent and a second 2D pixel mask derived from right image 511*c* (e.g., a right pixel mask) for the given agent (or perhaps just a single 2D pixel mask if the given agent is only detected in one of the individual images). As another example, the label for a given agent detected in a stereo image may comprise a pair of 2D bounding boxes for the given agent that includes a first 2D bounding box derived from left image 511*b* (e.g., a left bounding box) for the given agent and a second 2D bounding box derived from right image 511*c* (e.g., a right bounding box) for the given agent (or perhaps just a single 2D bounding box if the given agent is only detected in one of the individual images). As yet another example, processing may first be applied to each stereo image in order to generate a 3D point cloud that is representative of the scene depicted in the stereo image, in which case the label for a given agent detected in the stereo image may comprise a 3D convex hull or 3D bounding box that identifies the given agent within the generated 3D point cloud. The label for a given agent detected in a stereo image may take other forms as well.

The image processing function at block 522 may also involve an identification of a one or more tracking points for each of one or more agents identified within the stereo image comprising left image 511*b* and right image 511*c*. This function may take various forms, which may depend in part on the form of the label that has been generated for an agent. As one example, if the label for a given agent detected in the stereo image comprises a pair of 2D pixel masks, this function may involve designating a first lowest-observed pixel in the agent's first 2D pixel mask and a second lowest-observed pixel in the agent's second 2D pixel mask as tracking points for the given agent. As another example, if the label for a given agent detected in the stereo image comprises a pair of 2D bounding boxes, this function may involve designating a first point in the agent's first 2D bounding box (e.g., a left corner of the first 2D bounding box) and a second point in the agent's second 2D bounding box (e.g., a left corner of the second 2D bounding box) as the tracking points for the agent. As yet another example, if the label for a given agent detected in the stereo image comprises a 3D convex hull or 3D bounding box that identifies the given agent within a 3D point cloud that has been generated from the stereo image, this function may involve designating a given point within the 3D convex hull or 3D bounding box as a tracking point for the given agent (e.g., the centroid of the 3D convex hull or 3D bounding box). The function of identifying one or more tracking points for an agent may take various other forms as well.

At block 523, position information is derived for each of one or more agents identified in the stereo image comprising left image 511*b* and right image 511*c* based on the agent's one or more tracking points within the stereo image, which are received from block 522. This function of deriving position information for an agent detected in the stereo image may take various forms, which may depend in part on the nature of the one or more tracking points that have been identified for the agent.

For example, in an implementation where the one or more tracking points for an agent detected in a stereo image take the form of a pair of corresponding points within left image 511*b* and right image 511*c* (e.g., a lowest-observed pixel in each of left and right 2D pixel masks or a bottom corner of each of left and right 2D bounding boxes), the function of deriving position information for the agent may involve (i) applying a technique such as triangulation to the pair of corresponding points within left image 511*b* and right image 511*c* in order to determine a 3D position of some reference point for the agent (e.g., a point that intersects with the ground plane) that is represented in the camera coordinate frame of the stereo camera, (ii) using the pose of the stereo camera at the time that stereo image was captured, which may be represented according to a given world coordinate system (e.g., a local or global map coordinate frame), to translate the determine 3D position of the agent's reference point to the given world coordinate frame, and then (iii) optionally translating the determined 3D position of the agent's reference point within the given world coordinate frame to a 3D position of an estimated center point of the agent within the given world coordinate frame.

As another example, in an implementation where a 3D point cloud was previously generated from a stereo image and the one or more tracking points for an agent detected in the stereo image take the form of a center point of a 3D convex hull or a 3D bounding box that identifies the agent within the generated 3D point cloud, the function of deriving position information for the agent may involve (i) obtaining the 3D position of the center point of the 3D convex hull or 3D bounding box within the generated 3D point cloud, which may be represented in the camera coordinate frame of the stereo camera, and then (ii) using the pose of the stereo camera at the time that stereo image was captured, which may be represented according to a given world coordinate system (e.g., a local or global map coordinate frame), to translate the determined 3D position of the center point of the 3D convex hull or 3D bounding box from the camera coordinate system to the given world coordinate frame.

In this respect, it should be understood that, while the 3D position of the agent determined in one of these manners will be represented in terms of the given world coordinate system according to which the stereo camera's pose is represented, this determined 3D position nevertheless incorporates an estimate of the depth the agent relative to the stereo camera. Further, it should also be understood that, after determining the 3D position of the agent in one of these manners, the determined 3D position could also be translated from the given world coordinate frame according to which the stereo camera's pose is represented to some other coordinate frame that is to be used for representing agent trajectories.

The function of deriving position information for an agent detected in a stereo image may take various other forms as well.

It should also be understood that, in some implementations, position information that is derived from the stereo image could be leveraged to assist in the determination of the position information from the mono images. For example, in addition to using the above techniques to derive position information of one or more tracking points for the given agent, the above techniques could also be used to derive 3D position information for ground points appearing within the stereo image, and this 3D position information for the ground points may then in turn be used during the process of deriving position information of the given agent's tracking point within a mono image in a manner similar to how a ground map would otherwise be used to derive such position information. This process of using a 3D position of a ground point to derive position information of the given agent's tracking point within a mono image was described in detail above.

Returning to FIG. 5B, as noted above, the stereo camera typically captures a sequence of stereo images comprising left and right images 511b and 511c, and consequently, the functions described above with reference to blocks 522 and 523 are typically performed on each stereo image in that sequence of stereo images. As shown in FIG. 5B, the agent information that is determined across the sequence of two more stereo images (e.g., the agent tracking points and/or corresponding agent position information) may then be provided as input to block 524, where an evaluation is then performed on such agent information in order to determine which agent information corresponds which different agent from image to image and then associate each different agent's respective set of agent information across the sequence of stereo images together into a respective stereo track for the agent, which may take the form of a time sequence of position information for the agent (and perhaps also other state information for the agent such as orientation, velocity, and/or acceleration information) that has been derived from the sequence of stereo images. In operation, this agent tracking function may begin at block 524 after at least two stereo images have passed through blocks 522 and 523 or may begin after all stereo images from a particular period of driving have passed through blocks 522 and 523, among other possibilities.

In practice, evaluating the derived agent information across a plurality of stereo images to generate a respective stereo track for each identified agent may be performed in a variety of manners. As one possibility, this function may be performed in a similar manner as described before with reference to block 504 of FIG. 5A. For example, this function may generally involve (i) identifying a relationship between first position information derived from a first stereo image and second position information derived from a second stereo image, where the relationship indicates that the first and second position information are associated with the same agent, and then (ii) generating a stereo track for the agent that includes a time-sequence compilation of position information that was deemed to have a relationship.

As one particular example, identifying a relationship between image-specific position information may involve starting with (i) a first stereo image (e.g., the stereo image comprising left image 511b and right image 511c) in which a given agent was identified and (ii) an estimated center point of the given agent. Next, an evaluation is performed on a second stereo image that was captured next in sequence after the first stereo image in order to identify a candidate object represented in the second stereo image that is closest to the estimated center point from the first stereo image. Lastly, first position information for the given agent from the first stereo image is associated with second position information of the candidate object from the second stereo image such that the first and second position information are deemed to be related to the same agent (e.g., the given agent and the candidate object are the same agent).

Other techniques for identifying a relationship between image-specific position information from multiple stereo images are also possible, such as by evaluating similarity in pixel masks from one image to another, among other possibilities.

In example embodiments, after associating position information across multiple stereo images for a given agent, other types of information may also be derived that can form part of the given agent's stereo track, such as agent orientation, velocity, and/or acceleration information. For example, velocity and/or acceleration information can be derived based on the frame rate at which the stereo camera was capturing images and the position change of a given agent from one image to the next. Other manners of deriving velocity information and other state information are also possible.

Figure 11A:
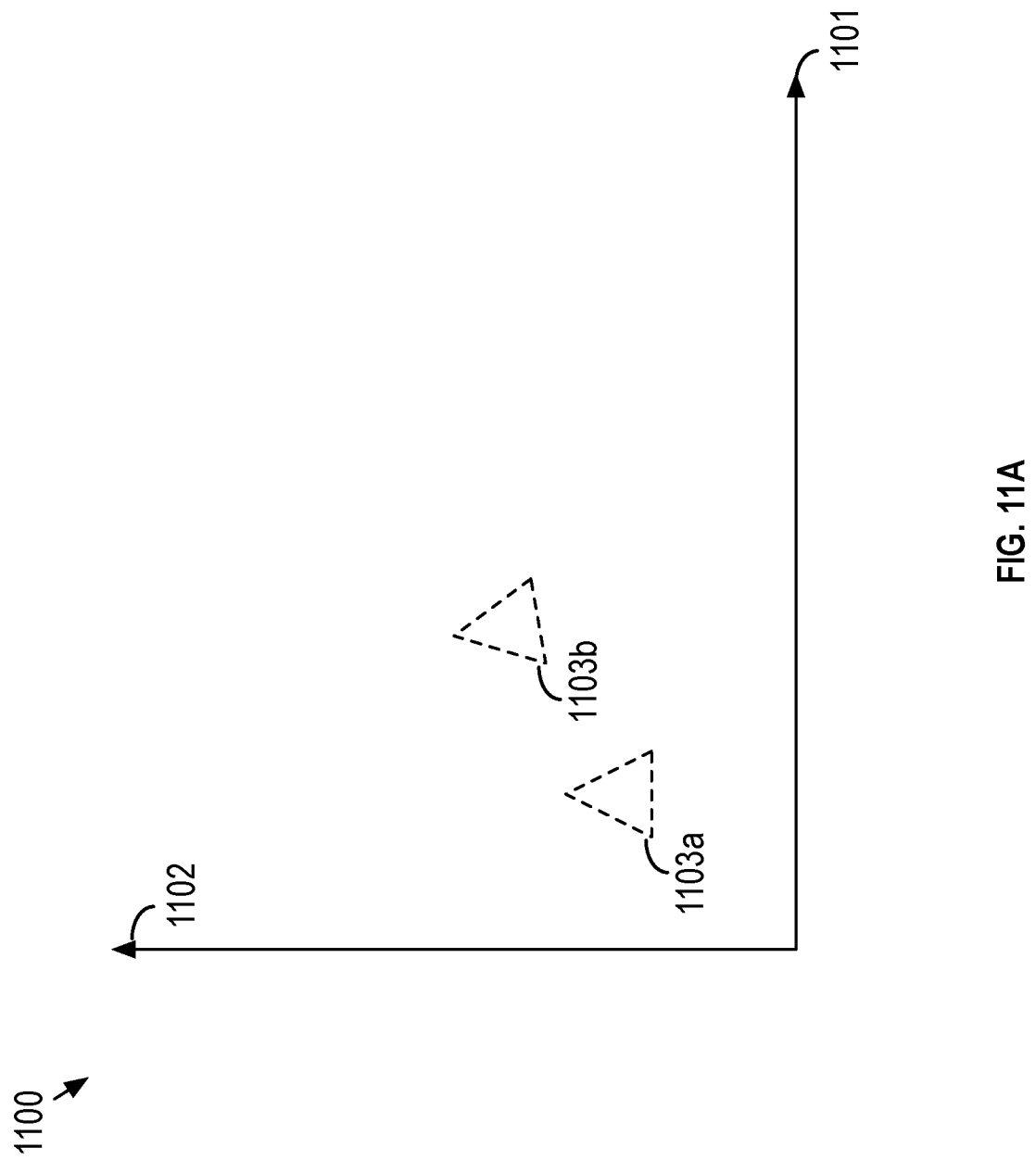
FIG. 11A is a simplified, two-dimensional representation of a derived stereo track for an agent.

FIG. 11A provides a simplified, two-dimensional representation of a derived stereo track for an agent. As shown, in plot 1100, a first axis 1101 corresponds to a first horizontal dimension of a given world coordinate frame and a second axis 1102 corresponds to a second horizontal dimension of the given world coordinate frame. In this example, triangles 1103a and 1103b represent position information (as well as orientation information) for the agent that were derived from two consecutive stereo images captured at times $t_a$ and $t_b$ with the front tip of each triangle (indicated by the triangle vertex pointing toward vertical axis 1102) representing the direction that the agent was facing at the given point in time. These triangles 1103a and 1103b represent the stereo track that was derived for the agent at block 524 of FIG. 5B.

After the respective mono and stereo tracks have been derived for a given agent in the manner described above, those mono and stereo tracks may then be fused together in order to produce a single trajectory for the given agent. This function of fusing an agent's mono and stereo tracks together may take various forms.

As an initial matter, this function of fusing an agent's mono and stereo tracks together may involve an operation of identifying a derived mono track and a derived stereo track that correspond to a same given agent detected within the sequence of mono and stereo images. In this respect, as discussed before with reference to FIG. 4B, while cameras 402a, 402b, and 402c have different fields of view, these cameras typically capture images that include respective representations of the same agents in the vehicle's surroundings. Thus, fusing tracks derived from images captured from these different viewpoints may help provide a more accurate and robust estimate of an agent's trajectory.

In practice, identifying a derived mono track and a derived stereo track correspond to a same given agent detected within the sequence of mono and stereo images may be performed in a variety of manners. For example, this function may involve (i) identifying one or more mono and stereo tracks that were derived based on images captured around the same capture times, (ii) for each such stereo track, identifying the respective portions of the stereo images that were deemed to belong to a given agent, and for each such mono track, identifying the respective portions of the mono images that were deemed to belong to a given agent, and then (iii) comparing the respective stereo and mono portions (e.g., by evaluating stereo and mono pixel masks) to identify a stereo and mono track that are related to the same unique agent. In some implementations, this function may additionally or alternatively be based in part on the respective physical configurations of the cameras that captured the images that were used to derive the stereo and mono tracks. Other manners of identifying a derived mono track and a derived stereo track correspond to a same given agent detected within the sequence of mono and stereo images are also possible.

Figure 11B:
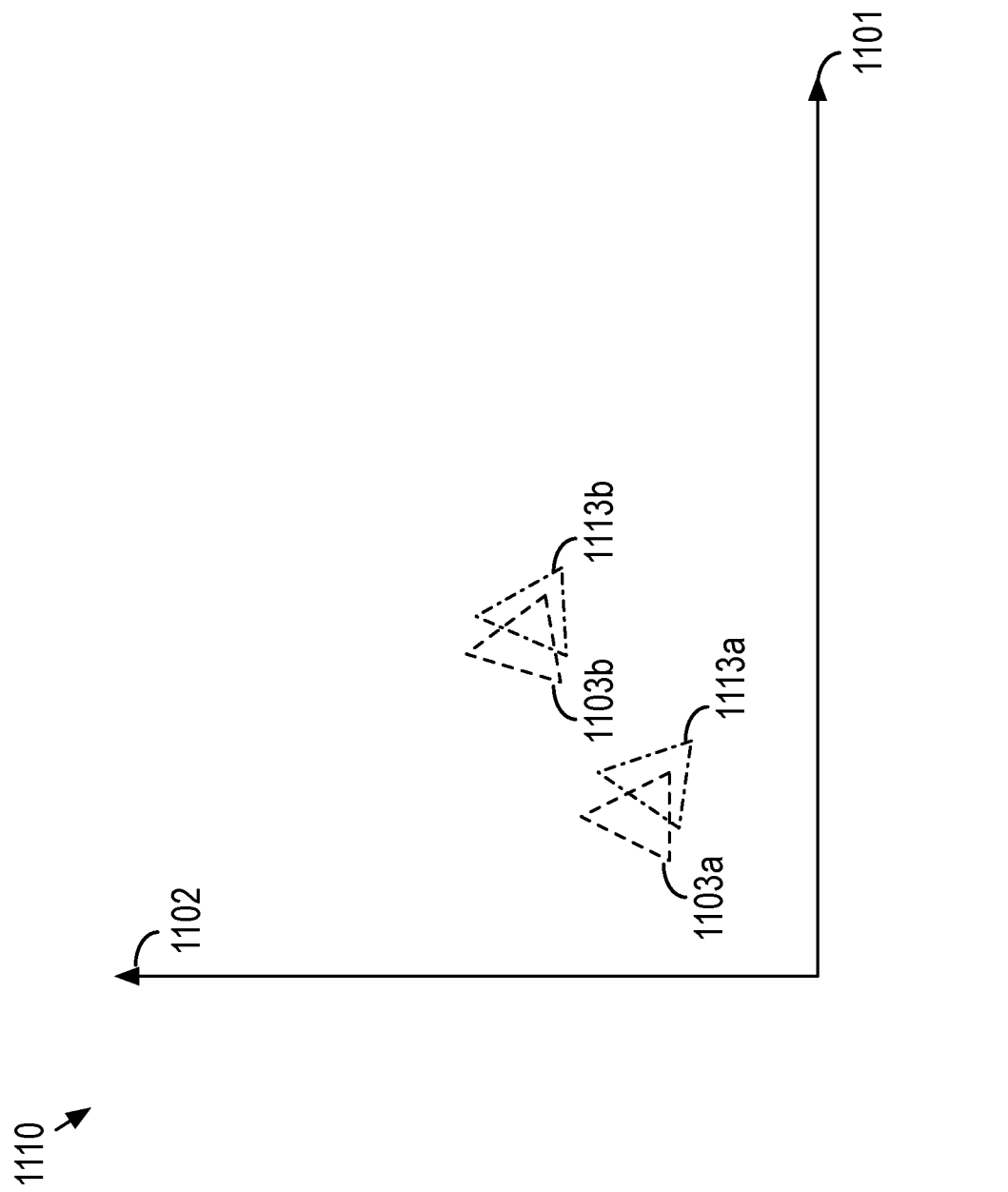
FIG. 11B is a simplified, two-dimensional representation of the derived stereo track for the agent from FIG. 11A and a mono track that is related to that stereo track.

FIG. 11B provides a simplified, two-dimensional representation of the derived stereo track for the agent of FIG. 11A and a mono track that is related to that stereo track. As shown, in plot 1110, triangles 1103a and 1103b from plot 1100 of FIG. 11A (illustrated with dashed lines) that represent position information (as well as orientation information) for the agent that were derived from two consecutive stereo images captured at times $t_a$ and $t_b$ are related to triangles 1113a and 1113b that represent position information (as well as orientation information) for the agent that were derived from two consecutive mono images captured at times $t_a$ and $t_b$. These triangles 1113a and 1113b (illustrated with dot-dashed lines) represent the mono track that was derived for the agent at block 514 of FIG. 5B.

After identifying a derived mono track and a derived stereo track correspond to a same given agent detected within the sequence of mono and stereo images, some alignment functions may optionally be performed on the identified mono and stereo tracks. For example, to the extent that the identified mono and stereo tracks are represented according to different coordinate frames (e.g., different local or global map coordinate frames), a translation may be applied to one or both of the tracks to place them within a common coordinate frame. As another example, to the extent that the identified mono and stereo tracks are represented according to different temporal reference frames, a translation may be applied to one or both of the tracks to place them within a common temporal reference frame. Other alignment functions are possible as well.

Once a given agent's mono and stereo tracks have been identified (and optionally aligned), then as shown at block 535 of FIG. 5B, the mono and stereo tracks for the given agent may then be provided as input to a motion model that encodes information about the expected real-world motion behavior of an agent of the same type as the given agent (e.g., physics-based constraints on how an agent of a given type is capable of moving in the real world), which functions to fuse the given agent's mono and stereo tracks together while also correcting for errors that may been introduced into the mono and/or stereo tracks as a result of occlusions or other measurement problems (e.g., gaps in the tracks where position information for the given agent is missing and/or position information within the tracks that is not consistent with how the given agent would have physically been capable of moving within the real world). In this way, applying the motion model to the given agent's derived track may fuse the given agent's mono and stereo tracks together into a single trajectory for the given agent that takes the expected real-world motion behavior of the given agent into account and provides a more accurate representation of the given agent's real-world pose evolution over time.

Figure 11C:
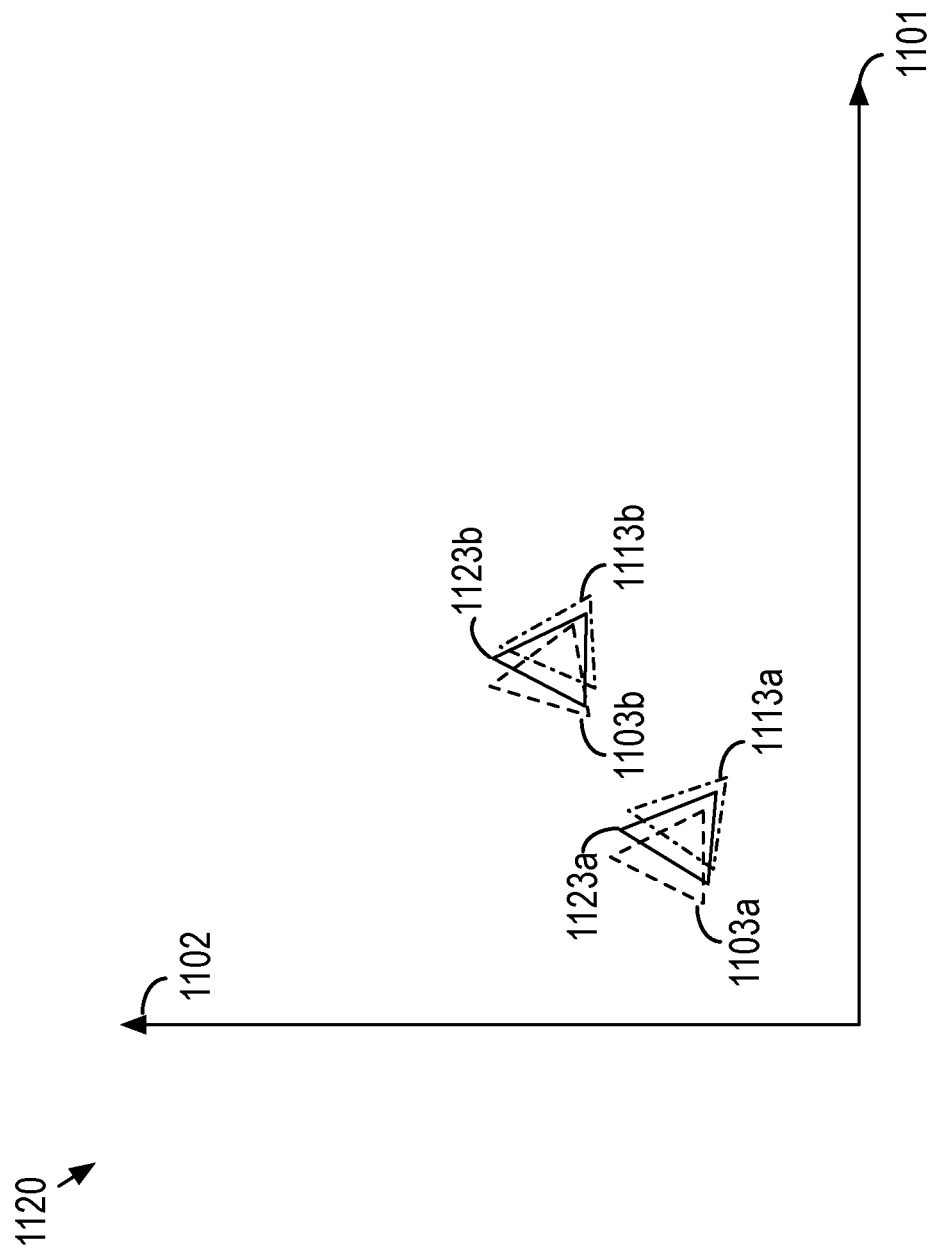
FIG. 11C is a simplified, two-dimensional representation of a fused trajectory that is output by a motion model after the mono and stereo tracks represented in FIG. 11B are provided as input to the motion model.
Figure 11E:
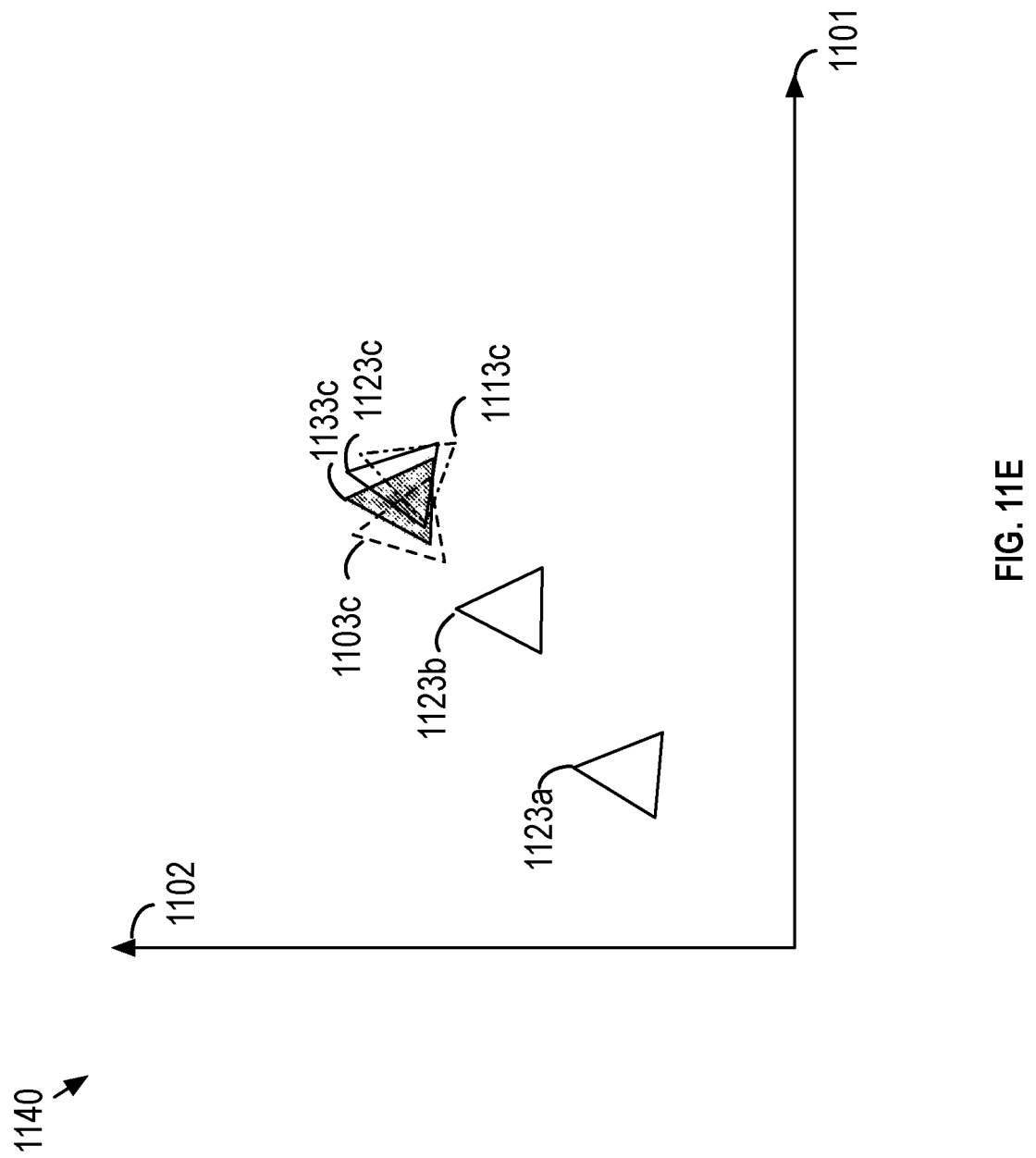
FIG. 11E is a simplified, two-dimensional representation of a trajectory with an updated agent pose that is output by a motion model for the agent whose predicted trajectory is represented in FIG. 11D.

In practice, applying a motion model to the given agent's mono and stereo tracks may be performed in a variety of manners and various types of motions models may be utilized to output an estimated trajectory for an agent. As one possibility, a motion model (e.g., a Kalman filter) may be utilized that generally functions to (i) receive a mono track for a given agent in the form of a series of time-sequence states derived from mono images and a stereo track for the given agent in the form of a time-sequence of position states derived from stereo images, (ii) fuse the respective time-sequences of position states together while applying pre-encoded knowledge about the expected real-world motion behavior of an agent of the same type as the given agent, and then (ii) output a single, "fused" time-sequence of position states for the given agent, which may then be designated the given agent's trajectory. FIGS. 11C-11E provide conceptual illustrations of various aspects of an example motion model's functionality.

In particular, FIG. 11C provides a simplified, two-dimensional representation of a trajectory that is output by a motion model (e.g., a Kalman filter) for the agent whose mono and stereo tracks are represented in FIG. 11B. As shown, the motion model outputted a trajectory represented by triangles 1123a and 1123b (illustrated in solid lines) that fused the stereo track represented by triangles 1103a and 1103b and the mono track represented by triangles 1113a and 1113b. In this way, the motion model functions to provide an agent trajectory that is typically more accurate than an estimated agent trajectory that is derived based on only a mono track or only a stereo track.

The motion model may also function to output a prediction of the given agent's pose at a future point in time and then update that prediction based on actual state information derived from mono and stereo images captured at that point in time. To illustrate, FIG. 11D provides a simplified, two-dimensional representation of a trajectory with a predicted agent pose that is output by a motion model (e.g., a Kalman filter) for the agent whose trajectory is represented in FIG. 11C. As shown, triangle 1133c represents the motion model's prediction for the agent's pose at future point in time $t_c$ that may have been derived based at least on the motion model's previously outputted trajectory for the agent represented by triangles 1123a and 1123b and/or the previous state information for the agent.

In turn, FIG. 11E provides a simplified, two-dimensional representation of a trajectory with an updated agent pose that is output by a motion model (e.g., a Kalman filter) for the agent whose predicted trajectory is represented in FIG. 11D. As shown, triangle 1103c represents a stereo pose that was derived based on a stereo image captured at time $t_c$, and triangle 1113c represents a mono pose that was derived based on a mono image captured at time $t_c$. Based at least on these actual derived stereo and mono poses and the motion model's predicted agent pose (represented by triangle 1133c), the motion model provided an update agent pose represented by triangle 1123c.

In some implementations, a Kalman filter may be utilized that may also apply different weights to the different tracks. For example, when applying the Kalman filter, the position information included in a stereo track may be given more or less weight than the position information included in a mono track along certain dimensions of the position information (e.g., the stereo-based position information may be weight more heavily along a dimension that corresponds to the depth of the given agent relative to the cameras and/or the mono-based position information may be weight more heavily along a dimension that corresponds to the lateral displacement of the given agent relative to the cameras). In this respect, it should be understood that the tracks that are input into the motion could be represented in the camera coordinate frame of the monocular and stereo cameras instead of a world coordinate frame to facilitate the weighting along these dimensions, in which case deriving the trajectory of the given agent may involve an additional function of translating the poses included in the trajectory from the camera coordinate frame to a world coordinate frame.

As another example, the Kalman filter may weight the tracks based on a measure of confidence regarding the predicted accuracy of the mono and/or stereo tracks, such that the position information included in a track associated with a higher measure of confidence (e.g., a stereo track) may be given more weight than the position information included in a track associated with a lower measure of confidence (e.g., a mono track). Other manners of applying weights to position information inputted to a Kalman filter are also possible.

Other manners of applying a motion model to derived mono and stereo tracks and other types of motion models are also possible.

Figure 12:
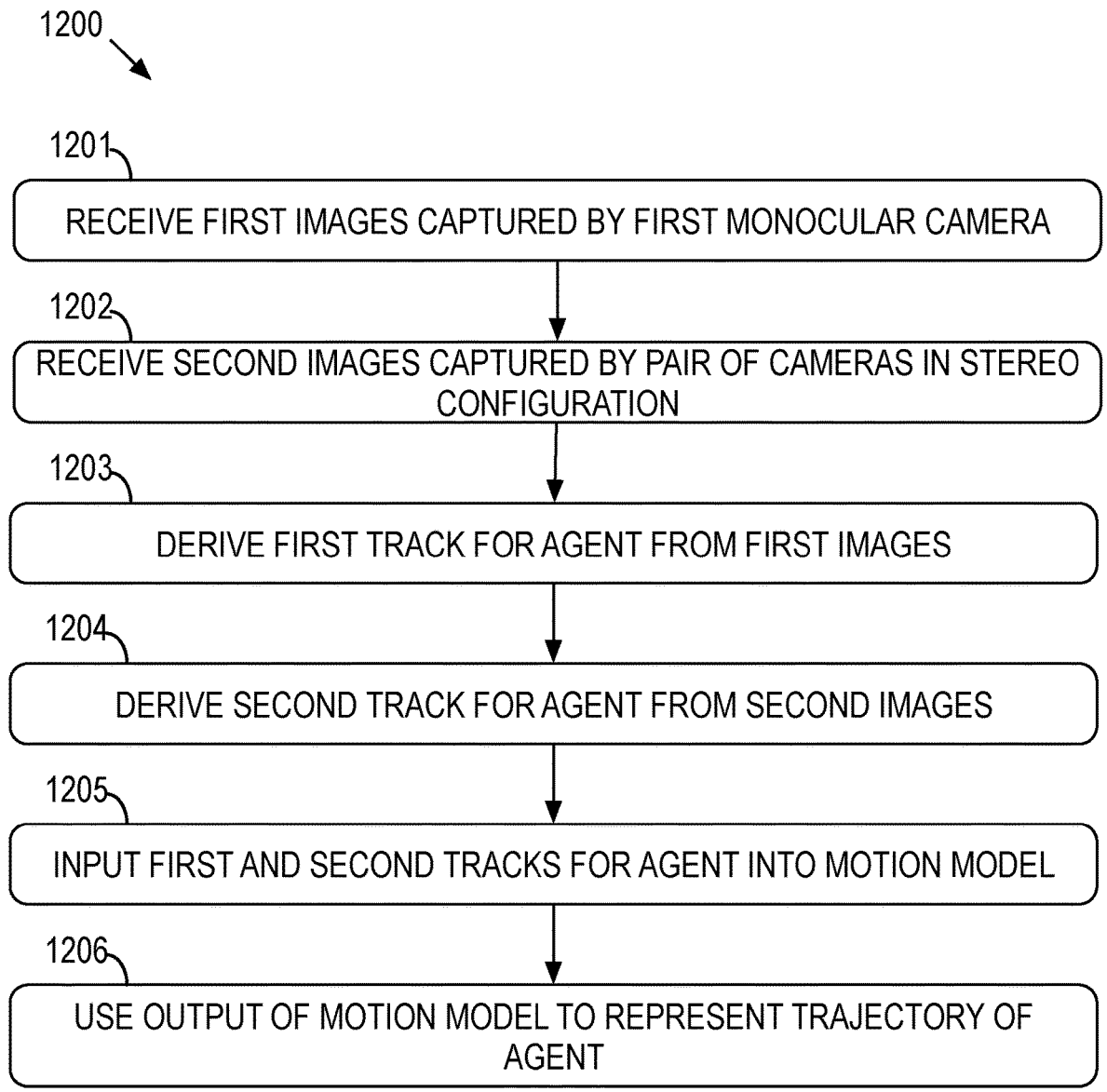
FIG. 12 is a flow diagram illustrating one example set of functions that may be performed to derive agent trajectories based on both mono and stereo images.

To summarize the aforementioned approach for deriving agent trajectories based on mono and stereo images, FIG. 12 provides a flow diagram 1200 illustrating one example set of functions that may be performed to derive such agent trajectories. At block 1201, a computing system receives a first sequence of images captured by a first monocular camera (e.g., camera 402a of FIG. 4B), where each image in the first sequence of images (e.g., each mono image) is representative of a vehicle's surrounding environment at a respective time. At block 1202, the computing system receives a second sequence of images captured by a pair of monocular cameras in a stereo configuration (e.g., left camera 402b and right camera 402c), where each image in the second sequence of images (e.g., each stereo image) is representative of the vehicle's surrounding environment at a respective time. At block 1203, the computing system derives a first track for a given agent from the first sequence of images, where the first track comprises a first sequence of time-specific position information for the given asset that incorporates an estimate of the given agent's depth relative to the monocular camera. At block 1204, the computing system derives a second track for the given agent from the second sequence of images, where the second track comprises a second sequence of time-specific position information for the given agent that incorporates an estimate of the given agent's depth relative to the stereo camera. At block 1205, the computing system fuses the first and second tracks for the given agent together using a motion model (e.g., a Kalman filter). At block 1206, the computing system uses an output of the motion model to represent a trajectory for the given object. Other sets of functions may instead be performed to derive agent trajectories based on mono and stereo images, which may involve adding to, removing from, or consolidating functions from flow diagram 1200.

The aforementioned second approach for deriving agent trajectories may be advantageous in that it leverages the strengths of a single mono image technique and the strengths of a stereo image technique while also mitigating the relative weaknesses of those techniques. Further, while this second approach has a relatively higher cost than the first approach in terms of equipping vehicles with the requisite hardware (e.g., at least two monocular cameras), this relatively higher cost is still lower than the cost of installing vehicles with the types of expensive, LiDAR-based sensor systems typically found on autonomous vehicles, which means that this approach may still be widely deployable in many vehicles. Further yet, by fusing an agent's mono and stereo tracks together using a motion model, this second approach provides another way to derive a trajectory for an agent from images that is based on a more accurate estimate of the agent's depth relative to the cameras and is also less susceptible to missing or errant position estimates caused by occlusion, which helps improve upon existing techniques for deriving agent trajectories from images.

As discussed above with reference to the first approach, agent trajectories derived using this second approach may be used for any of a variety of purposes, including but not limited to any of the various purposes discussed above (e.g., to help improve facilitate operations carried out by on-board computing systems of vehicles or transportation-matching platforms).

Figure 13:
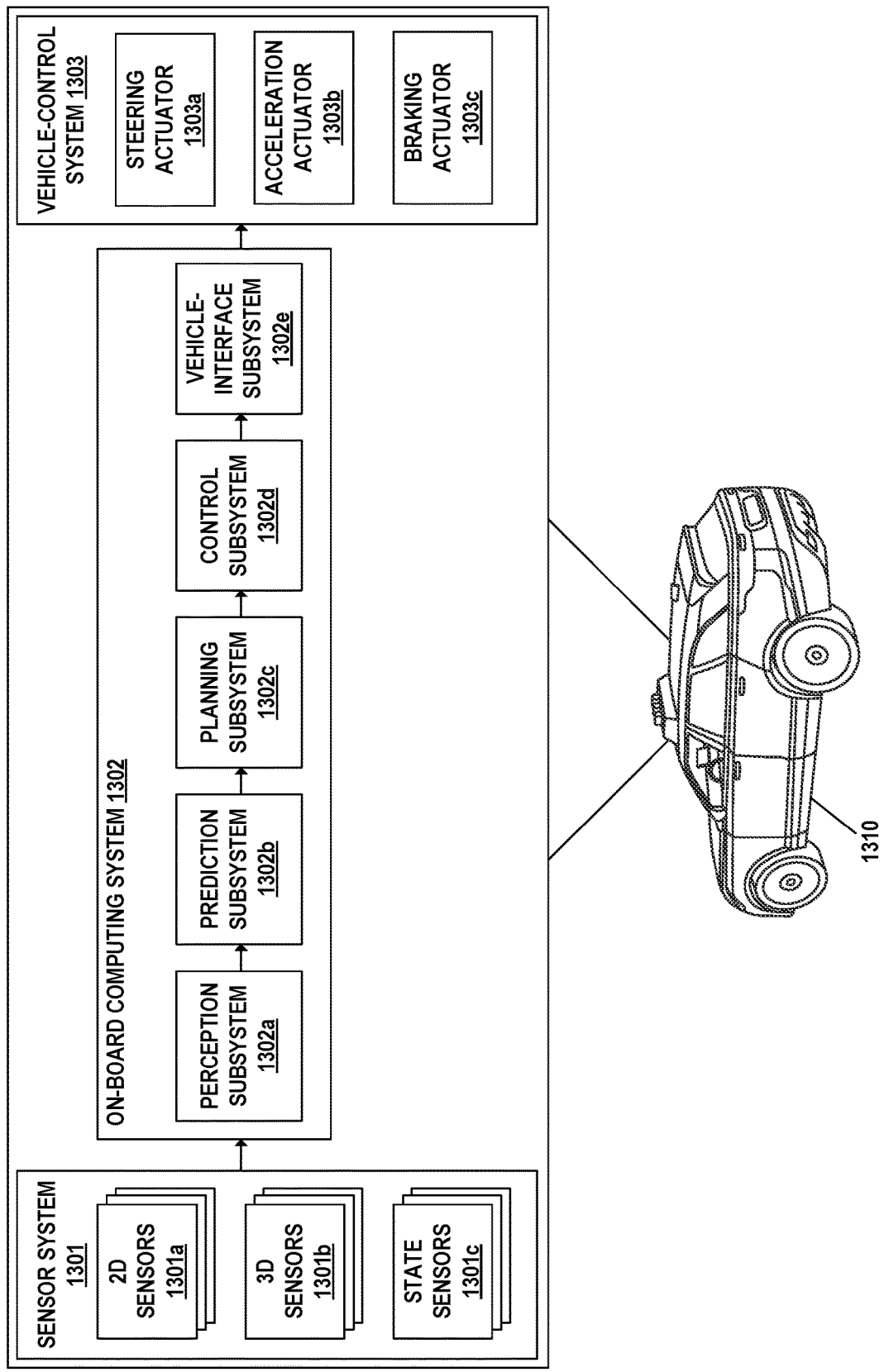
FIG. 13 is a simplified block diagram illustrating certain structural components of a vehicle.

In line with the discussion above, one possible use case for the trajectories derived using the disclosed techniques is for purposes of informing operations that are performed by an on-board computing system of a vehicle. Turning now to FIG. 13, a simplified block diagram is provided to illustrate certain systems that may be included in an example vehicle 1310 that takes the form of an autonomous vehicle. As shown, at a high level, vehicle 1310 may include at least (i) a sensor system 1301 that is configured to capture sensor data that is representative of the real-world environment being perceived by the vehicle (i.e., the vehicle's "surrounding environment") and/or the vehicle's operation within that real-world environment, (ii) an on-board computing system 1302 that is configured to perform functions related to autonomous operation of vehicle 1310 (and perhaps other functions as well), and (iii) a vehicle-control system 1303 that is configured to control the physical operation of vehicle 1310, among other possibilities. Each of these systems may take various forms.

In general, sensor system 1301 may comprise any of various different types of sensors, each of which is generally configured to detect one or more particular stimuli based on vehicle 1310 operating in a real-world environment. The sensors then output sensor data that is indicative of one or more measured values of the one or more stimuli at one or more capture times (which may each comprise a single instant of time or a range of times).

For instance, as one possibility, sensor system 1301 may include one or more two-dimensional (2D) sensors 1301a that are each configured to capture 2D data that is representative of the vehicle's surrounding environment (e.g., sensor system 601 may include an arrangement like those illustrated in FIG. 4A or 4B). Examples of 2D sensor(s) 1301*a* may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 1301*a* have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 1301 may include one or more three-dimensional (3D) sensors 1301*b* that are each configured to capture 3D data that is representative of the vehicle's surrounding environment. Examples of 3D sensor(s) 1301*b* may include a LIDAR unit, a 3D RADAR unit, a 3D SONAR unit, a 3D ultrasound unit, and a camera array equipped for stereo vision, among other possibilities. Further, in an example implementation, 3D sensor(s) 1301*b* may comprise an arrangement that is capable of capturing 3D sensor data representing a 360° view of the vehicle's surrounding environment, one example of which may take the form of a LIDAR unit that is configured to rotate 360° around its installation axis. Other 3D sensor arrangements are also possible.

As yet another possibility, sensor system 1301 may include one or more state sensors 1301*c* that are each configured to detect aspects of the vehicle's current state, such as the vehicle's current position, current orientation (e.g., heading/yaw, pitch, and/or roll), current velocity, and/or current acceleration of vehicle 1310. Examples of state sensor(s) 1301*c* may include an Inertial Measurement Unit (IMU) (which may be comprised of accelerometers, gyroscopes, and/or magnetometers), an Inertial Navigation System (INS), a Global Navigation Satellite System (GNSS) unit such as a Global Positioning System (GPS) unit, among other possibilities.

Sensor system 1301 may include various other types of sensors as well.

In turn, on-board computing system 1302 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 1302 may take the form of any one or more interfaces that facilitate communication with other systems of vehicle 1310 (e.g., sensor system 1301, vehicle-control system 1303, etc.) and/or remote computing systems (e.g., a transportation request management system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 1302 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 1302 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 1302 such that on-board computing system 1302 is configured to perform various functions related to the autonomous operation of vehicle 1310 (among other possible functions), and (ii) data that may be obtained, derived, or otherwise stored by on-board computing system 1302.

In one embodiment, on-board computing system 1302 may also be functionally configured into a number of different subsystems that are each tasked with performing a specific subset of functions that facilitate the autonomous operation of vehicle 1310, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well-including the possibility that different subsystems could be implemented via different hardware components of on-board computing system 1302.

As shown in FIG. 13, in one embodiment, the functional subsystems of on-board computing system 1302 may include (i) a perception subsystem 1302*a* that generally functions to derive a representation of the surrounding environment being perceived by vehicle 1310, (ii) a prediction subsystem 1302*b* that generally functions to predict the future state of each object detected in the vehicle's surrounding environment, (iii) a planning subsystem 1302*c* that generally functions to derive a behavior plan for vehicle 1310, (iv) a control subsystem 1302*d* that generally functions to transform the behavior plan for vehicle 1310 into control signals for causing vehicle 1310 to execute the behavior plan, and (v) a vehicle-interface subsystem 1302*e* that generally functions to translate the control signals into a format that vehicle-control system 1303 can interpret and execute. However, it should be understood that the functional subsystems of on-board computing system 1302 may take various other forms as well. Each of these example subsystems will now be described in further detail below.

For instance, the subsystems of on-board computing system 1302 may begin with perception subsystem 1302*a*, which may be configured to fuse together various different types of "raw" data that relate to the vehicle's perception of its surrounding environment and thereby derive a representation of the surrounding environment being perceived by vehicle 1310. In this respect, the "raw" data that is used by perception subsystem 1302*a* to derive the representation of the vehicle's surrounding environment may take any of various forms.

For instance, at a minimum, the "raw" data that is used by perception subsystem 1302*a* may include multiple different types of sensor data captured by sensor system 1301, such as 2D sensor data (e.g., image data) that provides a 2D representation of the vehicle's surrounding environment, 3D sensor data (e.g., LIDAR data) that provides a 3D representation of the vehicle's surrounding environment, and/or state data for vehicle 1310 that indicates the past and current position, orientation, velocity, and acceleration of vehicle 1310. Additionally, the "raw" data that is used by perception subsystem 1302a may include map data associated with the vehicle's location, such as high-definition geometric and/or semantic map data, which may be preloaded onto on-board computing system 1302 and/or obtained from a remote computing system. Additionally yet, the "raw" data that is used by perception subsystem 1302a may include navigation data for vehicle 1310 that indicates a specified origin and/or specified destination for vehicle 1310, which may be obtained from a remote computing system (e.g., a transportation request management system) and/or input by a human riding in vehicle 1310 via a user-interface component that is communicatively coupled to on-board computing system 1302. Additionally still, the "raw" data that is used by perception subsystem 1302a may include other types of data that may provide context for the vehicle's perception of its surrounding environment, such as weather data and/or traffic data, which may be obtained from a remote computing system. The "raw" data that is used by perception subsystem 1302a may include other types of data as well.

Advantageously, by fusing together multiple different types of raw data (e.g., both 2D sensor data and 3D sensor data), perception subsystem 1302a is able to leverage the relative strengths of these different types of raw data in a way that may produce a more accurate and precise representation of the surrounding environment being perceived by vehicle 1310.

Further, the function of deriving the representation of the surrounding environment perceived by vehicle 1310 using the raw data may include various aspects. For instance, one aspect of deriving the representation of the surrounding environment perceived by vehicle 1310 using the raw data may involve determining a current state of vehicle 1310 itself, such as a current position, a current orientation, a current velocity, and/or a current acceleration, among other possibilities. In this respect, perception subsystem 1302a may also employ a localization technique such as Simultaneous Localization and Mapping (SLAM) to assist in the determination of the vehicle's current position and/or orientation. (Alternatively, it is possible that on-board computing system 1302 may run a separate localization service that determines position and/or orientation values for vehicle 1310 based on raw data, in which case these position and/or orientation values may serve as another input to perception subsystem 1302a).

Another aspect of deriving the representation of the surrounding environment perceived by vehicle 1310 using the raw data may involve detecting objects within the vehicle's surrounding environment, which may result in the determination of class labels, bounding boxes, or the like for each detected object. In this respect, the particular classes of objects that are detected by perception subsystem 1302a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 1302a may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 1310 using the raw data may involve determining a current state of each object detected in the vehicle's surrounding environment, such as a current position (which could be reflected in terms of coordinates and/or in terms of a distance and direction from vehicle 1310), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 1310, among other possibilities.

The function of deriving the representation of the surrounding environment perceived by vehicle 1310 using the raw data may include other aspects as well.

Further yet, the derived representation of the surrounding environment perceived by vehicle 1310 may incorporate various different information about the surrounding environment perceived by vehicle 1310, examples of which may include (i) a respective set of information for each object detected in the vehicle's surrounding, such as a class label, a bounding box, and/or state information for each detected object, (ii) a set of information for vehicle 1310 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 1310 may incorporate other types of information about the surrounding environment perceived by vehicle 1310 as well.

Still further, the derived representation of the surrounding environment perceived by vehicle 1310 may be embodied in various forms. For instance, as one possibility, the derived representation of the surrounding environment perceived by vehicle 1310 may be embodied in the form of a data structure that represents the surrounding environment perceived by vehicle 1310, which may comprise respective data arrays (e.g., vectors) that contain information about the objects detected in the surrounding environment perceived by vehicle 1310, a data array that contains information about vehicle 1310, and/or one or more data arrays that contain other semantic information about the surrounding environment. Such a data structure may be referred to as a "parameter-based encoding."

As another possibility, the derived representation of the surrounding environment perceived by vehicle 1310 may be embodied in the form of a rasterized image that represents the surrounding environment perceived by vehicle 1310 in the form of colored pixels. In this respect, the rasterized image may represent the surrounding environment perceived by vehicle 1310 from various different visual perspectives, examples of which may include a "top down" view and a "bird's eye" view of the surrounding environment, among other possibilities. Further, in the rasterized image, the objects detected in the surrounding environment of vehicle 1310 (and perhaps vehicle 1310 itself) could be shown as color-coded bitmasks and/or bounding boxes, among other possibilities.

The derived representation of the surrounding environment perceived by vehicle 1310 may be embodied in other forms as well.

As shown, perception subsystem 1302a may pass its derived representation of the vehicle's surrounding environment to prediction subsystem 1302*b*. In turn, prediction subsystem 1302*b* may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 1310 to anticipate how the real-world objects in its surrounding environment are likely to behave in the future and then plan its behavior in a way that accounts for this future behavior.

Prediction subsystem 1302*b* may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 1302*b* is configured to predict this type of future state information for a detected object at multiple future times, such a time sequence of future states may collectively define a predicted future trajectory of the detected object. Further, in some embodiments, prediction subsystem 1302*b* could be configured to predict multiple different possibilities of future states for a detected object (e.g., by predicting the 3 most-likely future trajectories of the detected object). Prediction subsystem 1302*b* may be configured to predict other aspects of a detected object's future behavior as well.

In practice, prediction subsystem 1302*b* may predict a future state of an object detected in the vehicle's surrounding environment in various manners, which may depend in part on the type of detected object. For instance, as one possibility, prediction subsystem 1302*b* may predict the future state of a detected object using a data science model that is configured to (i) receive input data that includes one or more derived representations output by perception subsystem 1302*a* at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 1302, although it is possible that a future-state model could be created by on-board computing system 1302 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 1302*b* could predict the future state of a detected object in other manners as well. For instance, for detected objects that have been classified by perception subsystem 1302*a* as belonging to certain classes of static objects (e.g., roads, curbs, lane markings, etc.), which generally do not have the potential to move, prediction subsystem 1302*b* may rely on this classification as a basis for predicting that the future state of the detected object will remain the same at each of the one or more future times (in which case the state-prediction model may not be used for such detected objects). However, it should be understood that detected objects may be classified by perception subsystem 1302*a* as belonging to other classes of static objects that have the potential to change state despite not having the potential to move, in which case prediction subsystem 1302*b* may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 1310.

After predicting the future state of each object detected in the surrounding environment perceived by vehicle 1310 at one or more future times, prediction subsystem 1302*b* may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 1302*b* may pass the one or more derived representations of the vehicle's surrounding environment to planning subsystem 1302*c*. In turn, planning subsystem 1302*c* may be configured to use the one or more derived representations of the vehicle's surrounding environment (and perhaps other data) to derive a behavior plan for vehicle 1310, which defines the desired driving behavior of vehicle 1310 for some future period of time (e.g., the next 5 seconds).

The behavior plan that is derived for vehicle 1310 may take various forms. For instance, as one possibility, the derived behavior plan for vehicle 1310 may comprise a planned trajectory for vehicle 1310 that specifies a planned state of vehicle 1310 at each of one or more future times (e.g., each second over the next 5 seconds), where the planned state for each future time may include a planned position of vehicle 1310 at the future time, a planned orientation of vehicle 1310 at the future time, a planned velocity of vehicle 1310 at the future time, and/or a planned acceleration of vehicle 1310 (whether positive or negative) at the future time, among other possible types of state information. As another possibility, the derived behavior plan for vehicle 1310 may 1310 may comprise one or more planned actions that are to be performed by vehicle 1310 during the future window of time, where each planned action is defined in terms of the type of action to be performed by vehicle 1310 and a time and/or location at which vehicle 1310 is to perform the action, among other possibilities. The derived behavior plan for vehicle 1310 may define other planned aspects of the vehicle's behavior as well.

Further, in practice, planning subsystem 1302*c* may derive the behavior plan for vehicle 1310 in various manners. For instance, as one possibility, planning subsystem 1302*c* may be configured to derive the behavior plan for vehicle 1310 by (i) deriving a plurality of different "candidate" behavior plans for vehicle 1310 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 1310. Planning subsystem 1302c may derive the behavior plan for vehicle 1310 in various other manners as well.

After deriving the behavior plan for vehicle 1310, planning subsystem 1302c may pass data indicating the derived behavior plan to control subsystem 1302d. In turn, control subsystem 1302d may be configured to transform the behavior plan for vehicle 1310 into one or more control signals (e.g., a set of one or more command messages) for causing vehicle 1310 to execute the behavior plan. For instance, based on the behavior plan for vehicle 1310, control subsystem 1302d may be configured to generate control signals for causing vehicle 1310 to adjust its steering in a specified manner, accelerate in a specified manner, and/or brake in a specified manner, among other possibilities.

As shown, control subsystem 1302d may then pass the one or more control signals for causing vehicle 1310 to execute the behavior plan to vehicle-interface subsystem 1302e. In turn, vehicle-interface subsystem 1302e may be configured to translate the one or more control signals into a format that can be interpreted and executed by components of vehicle-control system 1303. For example, vehicle-interface subsystem 1302e may be configured to translate the one or more control signals into one or more control messages are defined according to a particular format or standard, such as a CAN bus standard and/or some other format or standard that is used by components of vehicle-control system 1303.

In turn, vehicle-interface subsystem 1302e may be configured to direct the one or more control signals to the appropriate control components of vehicle-control system 1303. For instance, as shown, vehicle-control system 1303 may include a plurality of actuators that are each configured to control a respective aspect of the vehicle's physical operation, such as a steering actuator 1303a that is configured to control the vehicle components responsible for steering (not shown), an acceleration actuator 1303b that is configured to control the vehicle components responsible for acceleration such as a throttle (not shown), and a braking actuator 1303c that is configured to control the vehicle components responsible for braking (not shown), among other possibilities. In such an arrangement, vehicle-interface subsystem 1302e of on-board computing system 1302 may be configured to direct steering-related control signals to steering actuator 1303a, acceleration-related control signals to acceleration actuator 1303b, and braking-related control signals to braking actuator 1303c. However, it should be understood that the control components of vehicle-control system 1303 may take various other forms as well.

Notably, the subsystems of on-board computing system 1302 may be configured to perform the above functions in a repeated manner, such as many times per second, which may enable vehicle 1310 to continually update both its understanding of the surrounding environment and its planned behavior within that surrounding environment.

Although not specifically shown, it should be understood that vehicle 1310 includes various other systems and components as well, including but not limited to a propulsion system that is responsible for creating the force that leads to the physical movement of vehicle 1310.

Figure 14:
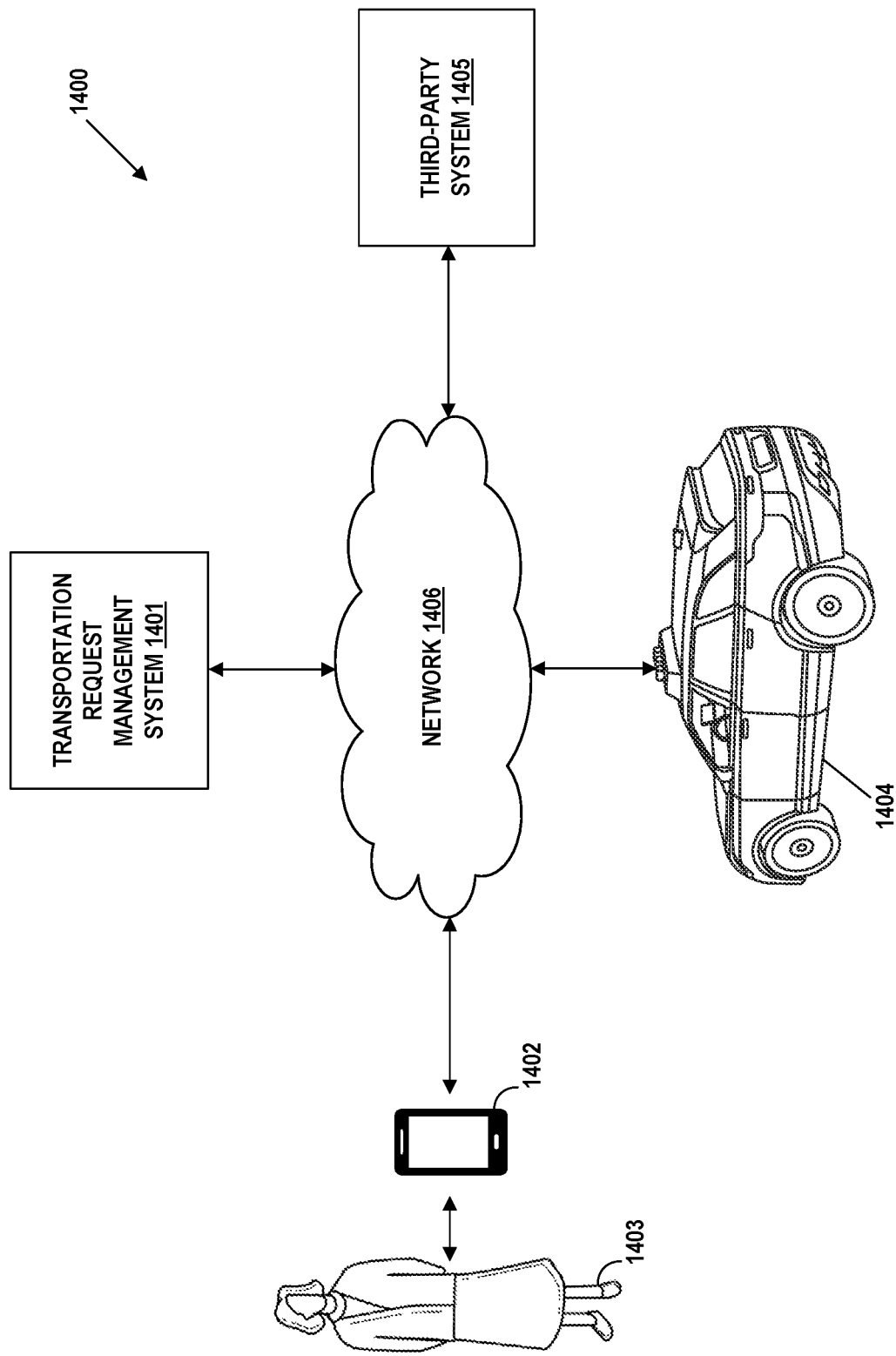
FIG. 14 is a simplified block diagram illustrating certain structural components of a transportation matching platform.

In line with the discussion above, another possible use case for the trajectories derived using the disclosed techniques is for purposes of informing operations that are performed by a transportation-matching platform. FIG. 14 is a simplified block diagram that illustrates one possible example of such a transportation matching platform 1400. As shown, transportation matching platform 1400 may include at its core a transportation request management system 1401, which may be communicatively coupled via a communication network 1406 to (i) a plurality of client stations of individuals interested in transportation (i.e., "transportation requestors"), of which client station 1402 of transportation requestor 1403 is shown as one representative example, (ii) a plurality of vehicles that are capable of providing the requested rides, of which example vehicle 1404 is shown as one representative example, and (iii) a plurality of third-party systems that are capable of providing respective subservices that facilitate the platform's transportation matching, of which third-party system 1405 is shown as one representative example.

Broadly speaking, transportation request management system 1401 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation request management system 1401 may comprise computing infrastructure of a public, private, and/or hybrid cloud (e.g., computing and/or storage clusters). In this respect, the entity that owns and operates transportation request management system 1401 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation request management system 1401 may comprise one or more dedicated servers. Other implementations of transportation request management system 1401 are possible as well.

As noted, transportation request management system 1401 may be configured to perform functions related to managing and facilitating transportation matching, which may take various forms. For instance, as one possibility, transportation request management system 1401 may be configured to receive ride requests from client stations of ride requestors (e.g., client station 1402 of ride requestor 1403) and then fulfill such ride requests by dispatching suitable vehicles, which may include vehicles such as vehicle 1404. In this respect, a ride request from client station 1402 of ride requestor 1403 may include various types of information.

For example, a ride request from client station 1402 of ride requestor 1403 may include specified pick-up and drop-off locations for the ride. As another example, a ride request from client station 1402 of ride requestor 1403 may include an identifier that identifies ride requestor 1403 in transportation request management system 1401, which may be used by transportation request management system 1401 to access information about ride requestor 1403 (e.g., profile information) that is stored in one or more data stores of transportation request management system 1401 (e.g., a relational database system), in accordance with the ride requestor's privacy settings. This ride requestor information may take various forms, examples of which include profile information about ride requestor 1403. As yet another example, a ride request from client station 1402 of ride requestor 1403 may include preferences information for ride requestor 1403, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation request management system 1401 may be configured to access ride information related to a requested ride, examples of which may include information about locations related to the ride, traffic data, route options, optimal pick-up or drop-off locations for the ride, and/or any other suitable information associated with a ride. As an example and not by way of limitation, when transportation request management system 1401 receives a request to ride from San Francisco International Airport (SFO) to Palo Alto, California, system 1401 may access or generate any relevant ride information for this particular ride request, which may include preferred pick-up locations at SFO, alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of ride requestor, and/or any other suitable information associated with the ride.

In some embodiments, portions of the accessed ride information could also be based on historical data associated with historical rides facilitated by transportation request management system 1401. For example, historical data may include aggregate information generated based on past ride information, which may include any ride information described herein and/or other data collected by sensors affixed to or otherwise located within vehicles (including sensors of other computing devices that are located in the vehicles such as client stations). Such historical data may be associated with a particular ride requestor (e.g., the particular ride requestor's preferences, common routes, etc.), a category/class of ride requestors (e.g., based on demographics), and/or all ride requestors of transportation request management system 1401.

For example, historical data specific to a single ride requestor may include information about past rides that a particular ride requestor has taken, including the locations at which the ride requestor is picked up and dropped off, music the ride requestor likes to listen to, traffic information associated with the rides, time of day the ride requestor most often rides, and any other suitable information specific to the ride requestor. As another example, historical data associated with a category/class of ride requestors may include common or popular ride preferences of ride requestors in that category/class, such as teenagers preferring pop music, ride requestors who frequently commute to the financial district may prefer to listen to the news, etc. As yet another example, historical data associated with all ride requestors may include general usage trends, such as traffic and ride patterns.

Using such historical data, transportation request management system 1401 could be configured to predict and provide ride suggestions in response to a ride request. For instance, transportation request management system 1401 may be configured to apply one or more machine-learning techniques to such historical data in order to "train" a machine-learning model to predict ride suggestions for a ride request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation request management system 1401 may only be capable of storing and later accessing historical data for a given ride requestor if the given ride requestor previously decided to "opt-in" to having such information stored. In this respect, transportation request management system 1401 may maintain respective privacy settings for each ride requestor that uses transportation matching platform 1400 and operate in accordance with these settings. For instance, if a given ride requestor did not opt-in to having his or her information stored, then transportation request management system 1401 may forgo performing any of the above-mentioned functions based on historical data. Other possibilities also exist.

Transportation request management system 1401 may be configured to perform various other functions related to managing and facilitating transportation matching as well.

Referring again to FIG. 14, client station 1402 of ride requestor 1403 may generally comprise any computing device that is configured to facilitate interaction between ride requestor 1403 and transportation request management system 1401. For instance, client station 1402 may 1402 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between ride requestor 1403 and transportation request management system 1401 (which may be embodied in the form of a software application, such as a mobile application, web application, or the like). In this respect, the interaction that may take place between ride requestor 1403 and transportation request management system 1401 may 1401 may take various forms, representative examples of which may include requests by ride requestor 1403 for new rides, confirmations by transportation request management system 1401 that ride requestor 1403 has been matched with a vehicle (e.g., vehicle 1404), and updates by transportation request management system 1401 regarding the progress of the ride, among other possibilities.

In turn, vehicle 1404 may generally comprise any vehicle that is equipped with autonomous technology, and in one example, may take the form of vehicle 1310 described above. Further, the functionality carried out by vehicle 1404 as part of transportation matching platform 1400 may take various forms, representative examples of which may include receiving a request from transportation request management system 1401 to handle a new ride, autonomously driving to a specified pickup location for a ride, autonomously driving from a specified pickup location to a specified drop-off location for a ride, and providing updates regarding the progress of a ride to transportation request management system 1401, among other possibilities.

Generally speaking, third-party system 1405 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation request management system 1401.

Moreover, third-party system 1405 may be configured to perform functions related to various subservices. For instance, as one possibility, third-party system 1405 may be configured to monitor traffic conditions and provide traffic data to transportation request management system 1401 and/or vehicle 1404, which may be used for a variety of purposes. For example, transportation request management system 1401 may use such data to facilitate fulfilling ride requests in the first instance and/or updating the progress of initiated rides, and vehicle 1404 may use such data to facilitate updating certain predictions regarding perceived agents and/or the vehicle's behavior plan, among other possibilities.

As another possibility, third-party system 1405 may be configured to monitor weather conditions and provide weather data to transportation request management system 1401 and/or vehicle 1404, which may be used for a variety of purposes. For example, transportation request management system 1401 may use such data to facilitate fulfilling ride requests in the first instance and/or updating the progress of initiated rides, and vehicle 1404 may use such data to facilitate updating certain predictions regarding perceived agents and/or the vehicle's behavior plan, among other possibilities.

As yet another possibility, third-party system 1405 may be configured to authorize and process electronic payments for ride requests. For example, after ride requestor 1403 submits a request for a new ride via client station 1402, third-party system 1405 may be configured to confirm that an electronic payment method for ride requestor 1403 is valid and authorized and then inform transportation request management system 1401 of this confirmation, which may cause transportation request management system 1401 to dispatch vehicle 1404 to pick up ride requestor 1403. After receiving a notification that the ride is complete, third-party system 1405 may then charge the authorized electronic payment method for ride requestor 1403 according to the fare for the ride. Other possibilities also exist.

Third-party system 1405 may be configured to perform various other functions related to subservices that facilitate the platform's transportation matching as well. It should be understood that, although certain functions were discussed as being performed by third-party system 1405, some or all of these functions may instead be performed by transportation request management system 801.

As discussed above, transportation request management system 1401 may be communicatively coupled to client station 1402, vehicle 1404, and third-party system 1405 via communication network 1406, which may take various forms. For instance, at a high level, communication network 1406 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 14 may take other forms as well, including the possibility that such communication paths include communication links and/or intermediate devices that are not shown.

In the foregoing arrangement, client station 1402, vehicle 1404, and/or third-party system 1405 may also be capable of indirectly communicating with one another via transportation request management system 1401. Additionally, although not shown, it is possible that client station 1402, vehicle 1404, and/or third-party system 1405 may be configured to communicate directly with one another as well (e.g., via a short-range wireless communication path or the like). Further, vehicle 1404 may also include a user-interface system that may facilitate direct interaction between ride requestor 1403 and vehicle 1404 once ride requestor 1403 enters vehicle 1404 and the ride begins.

It should be understood that transportation matching platform 1400 may include various other entities and take various other forms as well.

Figure 15:
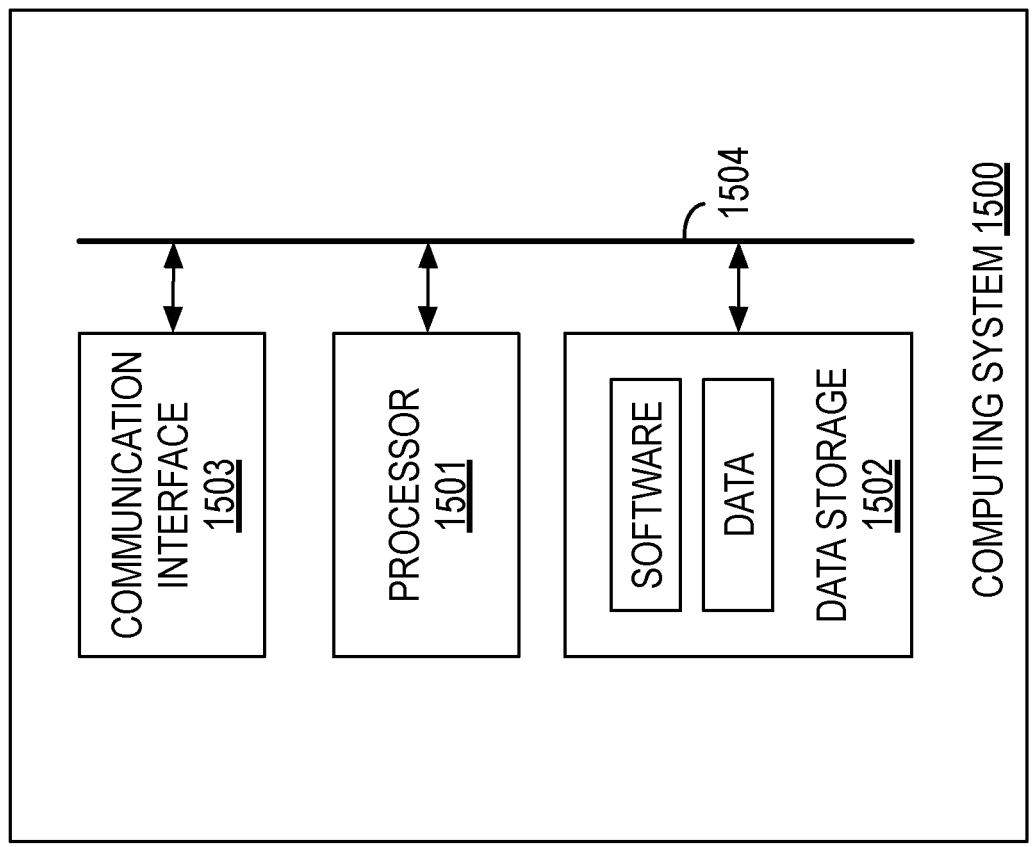
FIG. 15 is a simplified block diagram illustrating certain structural components of a computing system that may perform functions for deriving agent trajectories described herein.

FIG. 15 depicts a simplified block diagram of certain structural details of a computing system 1500 that may be configured to perform the some or all of the functions described above with reference to FIGS. 5A, 5B, 10, and 12. In example embodiments, computing system 1500 may take the form of a remote platform, such as a cloud-computing system or the like. In practice, computing system 1500 may include one or more computing systems (e.g., one or more servers, one or more mainframe computers, one or more desktop computers, etc.) that collectively include at least one processor 1501, data storage 1502, and at least one communication interface 1503, where such components may be communicatively connected by link 1504 that may take the form of a system bus, communication network, or some other connection mechanism. Each of these components may take various forms.

For instance, processor 1501 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Moreover, data storage 1502 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.). In line with the discussion above, it should also be understood that data storage 1502 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 15, data storage 1502 may be capable of storing both (i) program instructions (e.g., software) that are executable by processor 1501 such that computing system 1500 is capable of performing various functions related to deriving agent trajectories based on mono and/or stereo images (among other possible functions), and (ii) data that may be obtained, derived, or otherwise stored by computing system 1500.

Further yet, communication interface 1503 may take the form of any one or more interfaces that facilitate communication with other local systems and/or remote computing systems (e.g., a vehicle that captured various mono and/or stereo images), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Although not shown, computing system 1500 may additionally include one or more input/output (I/O) interfaces that are configured to either (i) receive and/or capture information at computing system 1500 and (ii) output information from computing system 1500 (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing system 1500 may include various other components and take various other forms as well.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
   deriving, from a first set of one or more images captured by a monocular camera associated with a vehicle, a first set of position information for a given agent;
   deriving, from a second set of one or more image pairs captured by a stereo camera associated with the vehicle, a second set of position information for the given agent;
   inputting the first and second sets of position information for the given agent into a motion model that encodes knowledge regarding physical constraints on the given agent's real-world behavior; and
   determining a trajectory for the given agent based on an output of the motion model.

2. The computer-implemented method of claim 1, further comprising:
   prior to inputting the first and second sets of position information for the given agent into the motion model, aligning the first and second sets of position information.

3. The computer-implemented method of claim 1, wherein the motion model fuses the first and second sets of position information together.

4. The computer-implemented method of claim 3, wherein, while fusing the first and second sets of position information together, the motion model weights the first set of position information and the second set of position information differently.

5. The computer-implemented method of claim 4, wherein the motion model weights different dimensions of the first and second sets of position information differently.

6. The computer-implemented method of claim 4, wherein the motion model weights the first set of position information and the second set of position information based on respective measures of confidence for the first and second sets of position information.

7. The computer-implemented method of claim 1, wherein the motion model corrects for errors in one or both of the first or second sets of position information.

8. The computer-implemented method of claim 1, wherein the first set of position information is included as part of a first track and the second set of position information is included as part of a second track.

9. The computer-implemented method of claim 8, wherein the motion model corrects for occlusions in one or both of the first or second tracks.

10. The computer-implemented method of claim 1, wherein the stereo camera associated with the vehicle comprises a pair of cameras in a stereo configuration, and wherein the pair of cameras includes the monocular camera.

11. A non-transitory computer-readable medium comprising program instructions stored thereon that, when executed by at least one processor of a computing system, cause the computing system to perform functions comprising:
    deriving, from a first set of one or more images captured by a monocular camera associated with a vehicle, a first set of position information for a given agent;
    deriving, from a second set of one or more image pairs captured by a stereo camera associated with the vehicle, a second set of position information for the given agent;
    inputting the first and second sets of position information for the given agent into a motion model that encodes knowledge regarding physical constraints on the given agent's real-world behavior; and
    determining a trajectory for the given agent based on an output of the motion model.

12. A computing system comprising:
    at least one processor;
    a non-transitory computer-readable medium; and
    program instructions stored on the non-transitory computer-readable medium that are executable by the at least one processor such that the computing system is configured to:
    derive, from a first set of one or more images captured by a monocular camera associated with a vehicle, a first set of position information for a given agent;
    derive, from a second set of one or more image pairs captured by a stereo camera associated with the vehicle, a second set of position information for the given agent;
    input the first and second sets of position information for the given agent into a motion model that encodes knowledge regarding physical constraints on the given agent's real-world behavior; and
    determine a trajectory for the given agent based on an output of the motion model.

13. The computing system of claim 12, wherein the motion model fuses the first and second sets of position information together.

14. The computing system of claim 13, wherein, while fusing the first and second sets of position information together, the motion model weights the first set of position information and the second set of position information differently.

15. The computing system of claim 14, wherein the motion model weights different dimensions of the first and second sets of position information differently.

16. The computing system of claim 14, wherein the motion model weights the first set of position information and the second set of position information based on respective measures of confidence for the first and second sets of position information.

17. The computing system of claim 12, wherein the motion model corrects for errors in one or both of the first or second sets of position information.

18. The computing system of claim 12, wherein the first set of position information is included as part of a first track and the second set of position information is included as part of a second track.

19. The computing system of claim 18, wherein the motion model corrects for occlusions in one or both of the first or second tracks.

20. The computing system of claim 12, wherein the stereo camera associated with the vehicle comprises a pair of cameras in a stereo configuration, and wherein the pair of cameras includes the monocular camera.

* * * * *